(12) United States Patent
Koike et al.

(10) Patent No.: US 12,353,190 B2
(45) Date of Patent: Jul. 8, 2025

(54) PROCESSING SYSTEM, DISPLAY SYSTEM, PROCESSING APPARATUS, PROCESSING METHOD FOR PROCESSING APPARATUS, AND PROCESSING PROGRAM

(71) Applicant: Sumitomo Electric Industries, Ltd., Osaka (JP)

(72) Inventors: Yusuke Koike, Osaka (JP); Yuma Higashiura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 190 days.

(21) Appl. No.: 17/916,029

(22) PCT Filed: Nov. 6, 2020

(86) PCT No.: PCT/JP2020/041484
§ 371 (c)(1),
(2) Date: Sep. 30, 2022

(87) PCT Pub. No.: WO2021/210207
PCT Pub. Date: Oct. 21, 2021

(65) Prior Publication Data
US 2023/0161320 A1    May 25, 2023

(30) Foreign Application Priority Data

Apr. 13, 2020  (WO) ................. PCT/JP2020/016248

(51) Int. Cl.
*G05B 19/4065*  (2006.01)
*B23C 5/10*   (2006.01)
(Continued)

(52) U.S. Cl.
CPC .......... *G05B 19/4065* (2013.01); *B23C 5/109* (2013.01); *B23C 9/00* (2013.01);
(Continued)

(58) Field of Classification Search
CPC ....... B23C 9/00; B23C 5/109; B23C 2260/76; B23Q 17/0966; G05B 19/4065;
(Continued)

(56) References Cited

U.S. PATENT DOCUMENTS

| 7,104,866 B2 | 9/2006 | Yamane et al. |
| 8,113,066 B2 | 2/2012 | Eckstein et al. |

(Continued)

FOREIGN PATENT DOCUMENTS

| CN | 109940459 A | 6/2019 |
| EP | 3486737 A1 | 5/2019 |

(Continued)

OTHER PUBLICATIONS

Notice of Allowance issued on Mar. 15, 2022, in corresponding Japanese patent Application No. 2021-564918, 5 pages.

(Continued)

*Primary Examiner* — An H Do
(74) *Attorney, Agent, or Firm* — XSENSUS LLP

(57) ABSTRACT

A processing system includes a cutting tool for milling, a plurality of sensors, and a processing unit. The plurality of sensors each is configured to measure a physical quantity that indicates a state related to loads on the cutting tool during cutting. The processing unit is configured to generate, based on measurement results from the respective sensors at a plurality of measurement time points, measurement data that is related to the loads in two directions on a plane perpendicular to a rotation axis of the cutting tool and that includes two-dimensional data at each of the measurement time points, and to perform a determination process concerning cutting in which the cutting tool is used, based on a two-dimensional shape indicated by the generated measurement data.

18 Claims, 21 Drawing Sheets

(51) Int. Cl.
    *B23C 9/00* (2006.01)
    *B23Q 17/09* (2006.01)
(52) U.S. Cl.
    CPC ...... *B23Q 17/0966* (2013.01); *B23C 2260/76* (2013.01); *G05B 2219/37087* (2013.01); *G05B 2219/37274* (2013.01); *G05B 2219/37355* (2013.01); *G05B 2219/41376* (2013.01); *G05B 2219/50203* (2013.01); *G05B 2219/50327* (2013.01)
(58) Field of Classification Search
    CPC ........... G05B 2219/37087; G05B 2219/50203; G05B 2219/41376; G05B 2219/50327; G05B 2219/37274; G05B 2219/37355
    See application file for complete search history.

(56) References Cited

U.S. PATENT DOCUMENTS

| | | | |
|---|---|---|---|
| 8,589,103 B2 * | 11/2013 | Matsubara | B23Q 17/20 702/66 |
| 9,839,982 B2 | 12/2017 | Ando | |
| 9,864,362 B2 | 1/2018 | Wunderlich et al. | |
| 10,010,991 B2 | 7/2018 | Takahashi et al. | |
| 10,265,818 B2 | 4/2019 | Tanaka | |
| 10,850,360 B2 | 12/2020 | Tanaka | |
| 10,990,085 B2 | 4/2021 | Otsu et al. | |
| 11,433,498 B2 | 9/2022 | Laurent et al. | |
| 11,630,005 B1 * | 4/2023 | Yudkevich | B23Q 17/0985 409/136 |
| 11,794,299 B2 * | 10/2023 | Maxted | G01B 5/012 |
| 2006/0019578 A1 | 1/2006 | Yamane et al. | |
| 2009/0235763 A1 | 9/2009 | Eckstein et al. | |
| 2015/0261207 A1 | 9/2015 | Wunderlich et al. | |
| 2016/0303698 A1 | 10/2016 | Takahashi et al. | |
| 2017/0001279 A1 | 1/2017 | Ando | |
| 2018/0029185 A1 | 2/2018 | Tanaka | |
| 2018/0071876 A1 | 3/2018 | Tanaka | |
| 2018/0117725 A1 | 5/2018 | Laurent et al. | |
| 2020/0026262 A1 | 1/2020 | Otsu et al. | |
| 2023/0161320 A1 | 5/2023 | Koike et al. | |
| 2023/0166376 A1 | 6/2023 | Koike | |

FOREIGN PATENT DOCUMENTS

| | | |
|---|---|---|
| JP | 63-62645 A | 3/1988 |
| JP | 3-1744 U | 1/1991 |
| JP | 6-8106 A | 1/1994 |
| JP | 11-118625 A | 4/1999 |
| JP | 2006-26855 A | 2/2006 |
| JP | 2006-71485 A | 3/2006 |
| JP | 2006-142460 A | 6/2006 |
| JP | 2013-132734 A | 7/2013 |
| JP | 2015-77658 A | 4/2015 |
| JP | 2016-40071 A | 3/2016 |
| JP | 2018-24086 A | 2/2018 |
| JP | 2018-43317 A | 3/2018 |
| JP | 2020-11330 A | 1/2020 |
| WO | 2019/101617 A1 | 5/2019 |
| WO | 2021/210037 A1 | 10/2021 |

OTHER PUBLICATIONS

International Search Report and Written Opinion mailed on Jul. 7, 2020, received for PCT Application PCT/JP2020/016248, filed on Apr. 13, 2020, 8 pages including English Translation.

Kaneko et al., "Cutting force model for end milling based on the inclined cutting theory", Journal of Japan Society of Mechanical Engineers, vol. 83, No. 856, 2017, 21 pages including English Translation.

Related Application, PCT/JP2020/016248, filed on Apr. 13, 2020 and filed as a U.S. National Phase, 67 pages.

Office Action "Notification of Reasons for Refusal" issued on Jan. 11, 2022, in corresponding Japanese patent Application No. 2021-564918, 6 pages.

Office Action issued on Jul. 2, 2024, in corresponding related U.S. Appl. No. 17/916,055, 51 pages.

Pro-Micron Gmbh: "Intelligent tool-holder—wear detection of every cutting edge with spike®", Sep. 24, 2019, URL:https://www.youtube.com/watch?v=la8n55VVwKI, 2 pages, XP093037979.

Office Action issued on Oct. 22, 2024, in related U.S. Appl. No. 17/916,055, 7 pages.

Final Office Action dated Feb. 3, 2025 in related U.S. Appl. No. 17/916,055 (22 pages).

Office Action dated May 19, 2025 in related U.S. Appl. No. 17/916,055 (12 pages).

* cited by examiner

| Shape of Cutting Tool | Cutting Condition | Calculation Data |
|---|---|---|
| Shape a | Cutting Condition w | Calculation Data CDaw |
| | Cutting Condition x | Calculation Data CDax |
| | Cutting Condition y | Calculation Data CDay |
| | Cutting Condition z | Calculation Data CDaz |
| | ⋮ | ⋮ |
| Shape b | Cutting Condition w | Calculation Data CDbw |
| | Cutting Condition x | Calculation Data CDbx |
| | ⋮ | ⋮ |
| ⋮ | ⋮ | ⋮ |

FIG. 25

| Kind of Comparison Information | | Pattern of Comparison Result | | | | | | | | | |
|---|---|---|---|---|---|---|---|---|---|---|---|
| | | A | B | C | D | E | F | G | H | I | J |
| Comparison Information CR1 in Target Period T1 | | D1≦Th1 | D1>Th1 | D1>Th1 | D1>Th1 | D1>Th1 | D1≦Th1 | D1>Th1 | D1>Th1 | D1>Th1 | D1>Th1 |
| Comparison Information CR2 in Target Period T1 | | D2≦Th2 | D2≦Th2 | D2>Th2 | D2>Th2 | D2≦Th2 | D2>Th2 | D2≦Th2 | D2≦Th2 | D2>Th2 | D2>Th2 |
| Comparison Information CR1 in Target Period T2 | | D1≦Th1 | D1>Th1 | D1≦Th1 | D1>Th1 | D1>Th1 | D1≦Th1 | D1≦Th1 | D1>Th1 | D1≦Th1 | D1>Th1 |
| Comparison Information CR3 in Target Period T1 | | Match | Match | Match | Match | Not Match | Not Match | Not Match | Not Match | Not Match | Not Match |
| Presence or Absence of Abnormality | | Absence | Presence | Presence | Presence | Presence | Absence | Presence | Presence | Presence | Presence |
| Cause of Abnormality | Abnormality Related to Setting of Cutting Tool | | Found | | Found | Found | | | Found | | Found |
| | Defect of Workpiece | | Found | Found | Found | | | Found | Found | Found | Found |
| | Loss of Cutting Edge Wear of Cutting Edge | | Found | Found | Found | | | | Found | Found | Found |

PROCESSING SYSTEM, DISPLAY SYSTEM, PROCESSING APPARATUS, PROCESSING METHOD FOR PROCESSING APPARATUS, AND PROCESSING PROGRAM

CROSS-REFERENCE TO RELATED APPLICATIONS

The present application is based on PCT/JP2020/041484, filed on Nov. 6, 2020, which claims priority to PCT/JP2020/016248, filed Apr. 13, 2020. This application is also related to U.S. Ser. No. 17/916,055, entitled: CUTTING SYSTEM, DISPLAY SYSTEM, PROCESSING APPARATUS, PROCESSING METHOD, AND PROCESSING PROGRAM, filed on Sep. 30, 2022. The entire contents of each of which are incorporated herein by reference.

TECHNICAL FIELD

The present disclosure relates to a processing system, a display system, a processing apparatus, a processing method for the processing apparatus, and a processing program.

BACKGROUND ART

PTL 1 (U.S. Patent Application Publication No. 2015/0261207) discloses the following method. A method for setting or monitoring operating parameters of a workpiece processing machine, where the workpiece processing machine has a tool holder and means for moving a workpiece and the tool holder relative to one another at least along a first axis, wherein, during the processing operation of the tool holder fitted with a workpiece and during application of the tool to a workpiece, values for at least one of the following (a) to (c) measured variables occurring on the tool during interaction between the tool and the workpiece and transmitted to the tool holder are recorded, and are recorded for the machining sequence, wherein the ascertained values for the at least one measured variable are used, in order to set, in a coordinated manner, the operating parameters with respect to an extended service life of the tool used, at the same time in conjunction with a processing time falling below a maximum machining time, or to monitor the processing operation with respect to a reproducibility of the processing operation, or in order to monitor a tool wear or a machine error of the workpiece processing machine.
(a) an axial force acting in a direction parallel to the first axis
(b) a torque present relative to the first axis or to an axis oriented parallel to the first axis
(c) bending torques or bending torque components according to direction and amount

PRIOR ART DOCUMENT

Patent Literature

PTL 1: U.S. Patent Application Publication No. 2015/0261207
PTL 2: European Patent Application Publication No. 3486737
PTL 3: Japanese Unexamined Patent Application Publication No. 2006-071485
PTL 4: Japanese Unexamined Patent Application Publication No. 11(1999)-118625

Non-Patent Literature

Non Patent Literature 1: Kaneko and three others, "Instantaneous rigid force model based on oblique cutting to predict milling force", Transactions of the Japan Society of Mechanical Engineers, 2017, Vol. 83, No. 856, p. 17-00247

SUMMARY OF INVENTION

A processing system of the present disclosure includes a cutting tool for milling, a plurality of sensors, and a processing unit. The plurality of sensors each is configured to measure a physical quantity that indicates a state related to loads on the cutting tool during cutting. The processing unit is configured to generate, based on measurement results from the respective sensors at a plurality of measurement time points, measurement data that is related to the loads in two directions on a plane perpendicular to a rotation axis of the cutting tool and that includes two-dimensional data at each of the measurement time points, and to perform a determination process concerning cutting in which the cutting tool is used, based on a two-dimensional shape indicated by the generated measurement data.

A processing apparatus of the present disclosure includes a measurement result obtaining unit configured to obtain measurement results from a plurality of sensors, the measurement results being physical quantities each indicating a state related to loads on a cutting tool for milling during cutting, a generation unit configured to generate, based on the measurement results from the respective sensors at a plurality of measurement time points obtained by the measurement result obtaining unit, measurement data that is related to the loads in two directions on a plane perpendicular to a rotation axis of the cutting tool and that includes two-dimensional data at each of the measurement time points, and a determination unit configured to perform a determination process concerning cutting in which the cutting tool is used, based on a two-dimensional shape indicated by the measurement data generated by the generation unit.

A processing method for a processing apparatus of the present disclosure includes obtaining measurement results from a plurality of sensors, the measurement results being physical quantities each indicating a state related to loads on a cutting tool for milling during cutting, generating, based on the obtained measurement results from the respective sensors at a plurality of measurement time points, measurement data that is related to the loads in two directions on a plane perpendicular to a rotation axis of the cutting tool and that includes two-dimensional data at each of the measurement time points, and performing a determination process concerning cutting in which the cutting tool is used, based on a two-dimensional shape indicated by the generated measurement data.

A processing program of the present disclosure for use in a processing apparatus causes a computer to function as a measurement result obtaining unit configured to obtain measurement results from a plurality of sensors, the measurement results being physical quantities each indicating a state related to loads on a cutting tool for milling during cutting, a generation unit configured to generate, based on the measurement results from the respective sensors at a plurality of measurement time points obtained by the measurement result obtaining unit, measurement data that is related to the loads in two directions on a plane perpendicular to a rotation axis of the cutting tool and that includes two-dimensional data at each of the measurement time points, and a determination unit configured to perform a determination process concerning cutting in which the cutting tool is used, based on a two-dimensional shape indicated by the measurement data generated by the generation unit.

A display system of the present disclosure includes a cutting tool for milling, a plurality of sensors, and a processing apparatus. The plurality of sensors each is configured to measure a physical quantity that indicates a state related to loads on the cutting tool during cutting. The processing apparatus is configured to generate, based on measurement results from the respective sensors at a plurality of measurement time points, measurement data that is related to the loads in two directions on a plane perpendicular to a rotation axis of the cutting tool and that includes two-dimensional data at each of the measurement time points, and to perform a process of displaying a two-dimensional shape indicated by the generated measurement data.

A processing apparatus of the present disclosure includes a measurement result obtaining unit configured to obtain measurement results from a plurality of sensors, the measurement results being physical quantities each indicating a state related to loads on a cutting tool for milling during cutting, a generation unit configured to generate, based on the measurement results from the respective sensors at a plurality of measurement time points obtained by the measurement result obtaining unit, measurement data that is related to the loads in two directions on a plane perpendicular to a rotation axis of the cutting tool and that includes two-dimensional data at each of the measurement time points, and a display processing unit configured to perform a process of displaying a two-dimensional shape that is indicated by the measurement data generated by the generation unit.

A processing method of the present disclosure for a processing apparatus includes obtaining measurement results from a plurality of sensors, the measurement results being physical quantities each indicating a state related to loads on a cutting tool for milling during cutting, generating, based on the obtained measurement results from the respective sensors at a plurality of measurement time points, measurement data that is related to the loads in two directions on a plane perpendicular to a rotation axis of the cutting tool and that includes two-dimensional data at each of the measurement time points, and performing a process of displaying a two-dimensional shape that is indicated by the generated measurement data.

A processing program of the present disclosure for use in a processing apparatus causes a computer to function as a measurement result obtaining unit configured to obtain measurement results from a plurality of sensors, the measurement results being physical quantities each indicating a state related to loads on a cutting tool for milling during cutting, a generation unit configured to generate, based on the measurement results from the respective sensors at a plurality of measurement time points obtained by the measurement result obtaining unit, measurement data that is related to the loads in two directions on a plane perpendicular to a rotation axis of the cutting tool and that includes two-dimensional data at each of the measurement time points, and a display processing unit configured to perform a process of displaying a two-dimensional shape that is indicated by the measurement data generated by the generation unit.

An aspect of the present disclosure can be realized not only as a processing system including such a characteristic processing unit but also as a semiconductor integrated circuit that realizes a part or all of the processing system. Further, one aspect of the present disclosure can be realized not only as a processing apparatus including such a characteristic processing unit but also as a semiconductor integrated circuit that realizes a part or all of the processing apparatus.

BRIEF DESCRIPTION OF DRAWINGS

FIG. 25 is a diagram showing an example of a result of an abnormality determination process by the processing unit in the processing apparatus according to the embodiment of the present disclosure.

DESCRIPTION OF EMBODIMENTS

Figure 1:
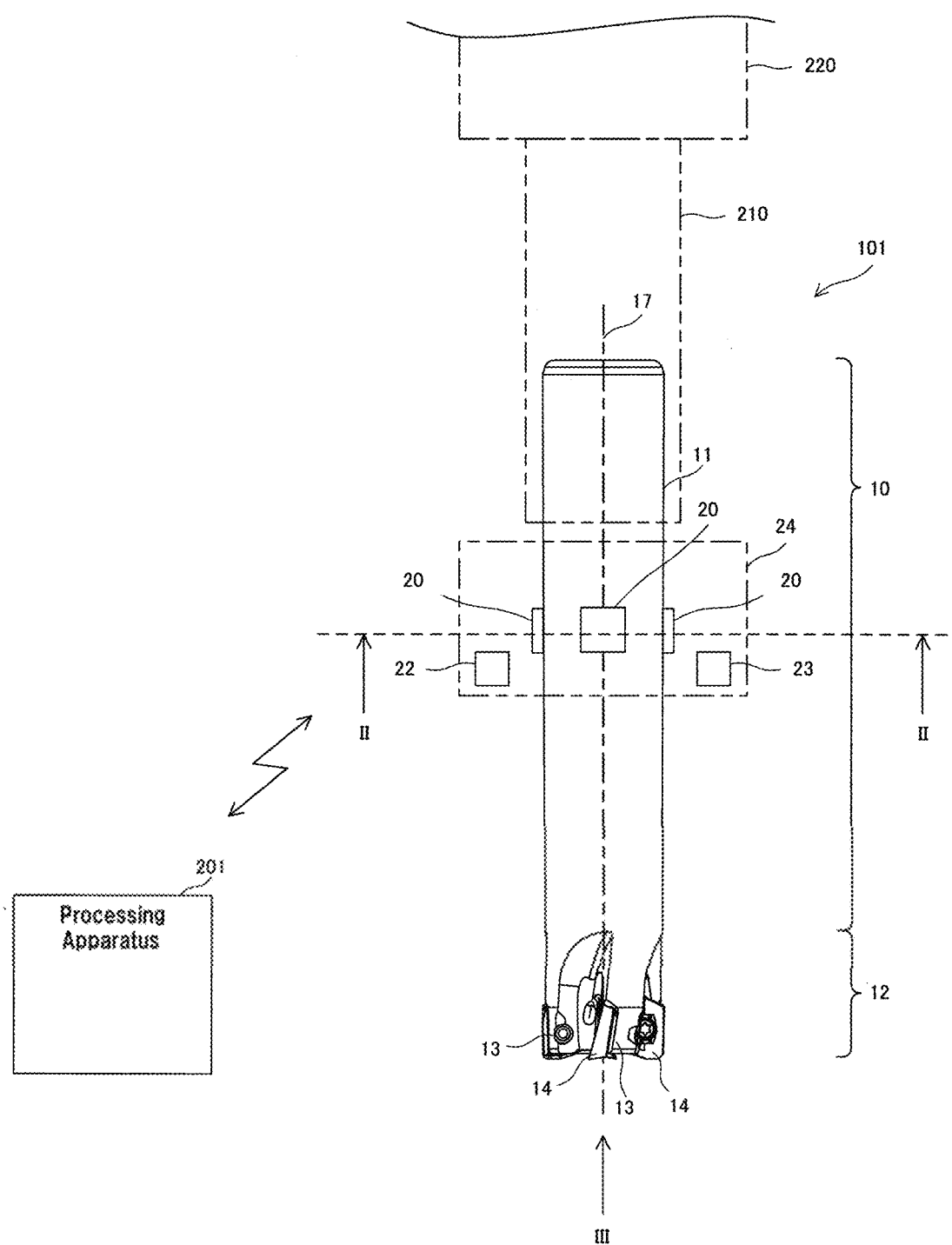
FIG. 1 is a diagram showing a configuration of a processing system according to an embodiment of the present disclosure.

Conventionally, there has been proposed a technique in which a sensor is attached to a cutting tool and an abnormality of a cutting blade in the cutting tool is detected based on a measurement result by the sensor during cutting.

Problems to be Solved by Present Disclosure

There is a demand for a technique capable of realizing excellent functions relating to the state of cutting using a cutting tool beyond the technique of PTL 1.

The present disclosure has been made in order to solve the above-described problem, and an object thereof is to provide a processing system, a display system, a processing apparatus, a processing method for the processing apparatus, and a processing program capable of realizing excellent functions relating to a state of cutting using a cutting tool.

Advantageous Effects of Present Disclosure

According to the present disclosure, it is possible to realize excellent functions relating to the state of cutting using a cutting tool.

Description of Embodiments of Present Disclosure

First, the contents of the embodiments of the present disclosure will be listed and explained.

(1) A processing system according to an embodiment of the present disclosure includes a cutting tool for milling, a plurality of sensors, and a processing unit. The plurality of sensors each is configured to measure a physical quantity that indicates a state related to loads on the cutting tool during cutting. The processing unit is configured to generate, based on measurement results from the respective sensors at a plurality of measurement time points, measurement data that is related to the loads in two directions on a plane perpendicular to a rotation axis of the cutting tool and that includes two-dimensional data at each of the measurement time points, and to perform a determination process concerning cutting in which the cutting tool is used, based on a two-dimensional shape indicated by the generated measurement data.

In this manner, with the configuration in which the determination process is performed based on the two-dimensional shape indicated by the measurement data including the plurality of pieces of two-dimensional data generated based on the measurement results from the plurality of sensors, for example, it is possible to perform the determination related to cutting with a simple process based on the analysis result of the two-dimensional shape. Therefore, it is possible to realize an excellent function regarding the state of cutting using the cutting tool.

(2) The processing unit is configured to obtain calculation data that is calculated based on a shape of the cutting tool and that includes a plurality of pieces of two-dimensional data, at a plurality of time points, related to the loads in the two directions on the plane perpendicular to the rotation axis, and to perform the determination process, further based on a two-dimensional shape indicated by the obtained calculation data.

With such a configuration, for example, it is possible to perform a determination regarding cutting based on a degree of similarity between the two-dimensional shape of the two-dimensional data to be generated when normal and ideal cutting is performed and the two-dimensional shape of the actually generated two-dimensional data.

(3) The processing unit is configured to obtain the calculation data that is calculated further based on a cutting condition when the cutting tool is used, and to perform the determination process concerning an abnormality in cutting in which the cutting tool is used, based on a result of comparing a two-dimensional shape indicated by first measurement data that includes a plurality of pieces of two-dimensional data corresponding to the plurality of measurement time points in a first period with a two-dimensional shape indicated by first calculation data that is calculated based on the cutting condition in the first period.

With such a configuration, it is possible to detect an abnormality in cutting based on the degree of deviation of the two-dimensional shape of the actually generated two-dimensional data from the ideal two-dimensional shape.

(4) The processing unit is configured to perform the determination process, based on the two-dimensional shape indicated by the calculation data that differs depending on the cutting condition.

With such a configuration, it is possible to detect an abnormality in cutting performed under various cutting conditions.

(5) The processing unit is configured to perform the determination process, further based on a result of comparing a two-dimensional shape indicated by second measurement data that includes a plurality of pieces of two-dimensional data corresponding to the plurality of measurement time points in a second period different from the first period with the two-dimensional shape indicated by the first measurement data.

With such a configuration, in a case where an abnormality has occurred in advance at a certain point in the past, it is possible to detect further occurrence of an abnormality, expansion of an abnormality, and the like.

(6) The processing unit is configured to perform the determination process, further based on a result of comparing a two-dimensional shape indicated by second measurement data that includes a plurality of pieces of two-dimensional data corresponding to the plurality of measurement time points in a second period different from the first period with a two-dimensional shape indicated by second calculation data that is calculated based on the cutting condition in the second period.

With such a configuration, it is possible to specify the cause of the abnormality in more detail based on the degree of deviation of the two-dimensional shape of the two-dimensional data actually generated at a certain point in time in the past from the ideal two-dimensional shape.

(7) The processing unit is configured to perform the determination process, further based on a result of comparing the cutting condition in the first period with the cutting condition in a second period different from the first period.

With such a configuration, it is possible to specify the cause of the abnormality in more detail based on presence or absence of a change in the cutting condition.

(8) The processing unit is configured to perform the determination process, based on a degree of similarity between the two-dimensional shape indicated by the measurement data and the two-dimensional shape indicated by the calculation data.

With such a configuration, since the determination process can be performed based on the degree of deviation of the two-dimensional shape of the actually generated two-dimensional data from the ideal two-dimensional shape, it is possible to more accurately detect an abnormality in cutting, for example.

(9) The processing unit is configured to perform the determination process concerning a cutting condition of cutting in which the cutting tool is used.

With such a configuration, it is possible to estimate the cutting condition based on the calculation data indicating the two-dimensional shape having a high degree of similarity with the two-dimensional shape of the actually generated two-dimensional data among the plurality of calculation data.

(10) The processing unit is configured to generate the measurement data that includes a plurality of pieces of two-dimensional data corresponding to the plurality of measurement time points in a period of time taken for the cutting tool to rotate a plurality of times.

With such a configuration, it is possible to perform a more accurate determination process using measurement data in which variation for each rotation of the cutting tool is reduced.

(11) The processing unit is configured to generate the measurement data in which a rotation angle between two pieces of two-dimensional data adjacent to each other around the rotation axis is 5° or less and to obtain the calculation data in which a rotation angle between two pieces of two-dimensional data adjacent to each other around the rotation axis is 5° or less.

With such a configuration, it is possible to more precisely compare the two-dimensional shape indicated by the measurement data with the two-dimensional shape indicated by the calculation data, and thus it is possible to perform a more accurate determination process.

(12) The processing unit is configured to perform the determination process concerning cutting in which the cutting tool is used, based on a degree of rotational symmetry of the two-dimensional shape indicated by the measurement data.

With such a configuration, it is possible to make a determination regarding cutting with a simple process using more limited information.

(13) A processing apparatus according to the embodiment of the present disclosure includes a measurement result obtaining unit configured to obtain measurement results from a plurality of sensors, the measurement results being physical quantities each indicating a state related to loads on a cutting tool for milling during cutting, a generation unit configured to generate, based on the measurement results from the respective sensors at a plurality of measurement time points obtained by the measurement result obtaining unit, measurement data that is related to the loads in two directions on a plane perpendicular to a rotation axis of the cutting tool and that includes two-dimensional data at each of the measurement time points, and a determination unit configured to perform a determination process concerning cutting in which the cutting tool is used, based on a two-dimensional shape indicated by the measurement data generated by the generation unit.

In this manner, with the configuration in which the determination process is performed based on the two-dimensional shape indicated by the measurement data including the plurality of pieces of two-dimensional data generated based on the measurement results from the plurality of sensors, for example, it is possible to perform the determination related to cutting with a simple process based on the analysis result of the two-dimensional shape. Therefore, it is possible to realize an excellent function regarding the state of cutting using the cutting tool.

(14) A processing method according to the embodiment of present disclosure for a processing apparatus includes obtaining measurement results from a plurality of sensors, the measurement results being physical quantities each indicating a state related to loads on a cutting tool for milling during cutting, generating, based on the obtained measurement results from the respective sensors at a plurality of measurement time points, measurement data that is related to the loads in two directions on a plane perpendicular to a rotation axis of the cutting tool and that includes two-dimensional data at each of the measurement time points, and performing a determination process concerning cutting in which the cutting tool is used, based on a two-dimensional shape indicated by the generated measurement data.

In this manner, by the method of performing the determination process on the basis of the two-dimensional shape indicated by the measurement data including the plurality of pieces of two-dimensional data generated based on the measurement results from the plurality of sensors, for example, it is possible to perform the determination regarding the cutting with a simple process based on the analysis result of the two-dimensional shape. Therefore, it is possible to realize an excellent function regarding the state of cutting using the cutting tool.

(15) A processing program according to the embodiment of the present disclosure for use in a processing apparatus causes a computer to function as a measurement result obtaining unit configured to obtain measurement results from a plurality of sensors, the measurement results being physical quantities each indicating a state related to loads on a cutting tool for milling during cutting, a generation unit configured to generate, based on the measurement results from the respective sensors at a plurality of measurement time points obtained by the measurement result obtaining unit, measurement data that is related to the loads in two directions on a plane perpendicular to a rotation axis of the cutting tool and that includes two-dimensional data at each of the measurement time points and a determination unit configured to perform a determination process concerning cutting in which the cutting tool is used, based on a two-dimensional shape indicated by the measurement data generated by the generation unit.

In this manner, with the configuration in which the determination process is performed based on the two-dimensional shape indicated by the measurement data including the plurality of pieces of two-dimensional data generated based on the measurement results from the plurality of sensors, for example, it is possible to perform the determination related to cutting with a simple process based on the analysis result of the two-dimensional shape. Therefore, it is possible to realize an excellent function regarding the state of cutting using the cutting tool.

(16) A display system according to the embodiment of the present disclosure includes a cutting tool for milling, a plurality of sensors, and a processing apparatus. The plurality of sensors each is configured to measure a physical quantity that indicates a state related to loads on the cutting tool during cutting. The processing apparatus is configured to generate, based on measurement results from the respective sensors at a plurality of measurement time points, measurement data that is related to the loads in two directions on a plane perpendicular to a rotation axis of the cutting tool and that includes two-dimensional data at each of the measurement time points, and to perform a process of displaying a two-dimensional shape indicated by the generated measurement data.

In this manner, with the configuration in which the processing of displaying the two-dimensional shape indicated by the measurement data including the plurality of pieces of two-dimensional data generated based on the measurement results from the plurality of sensors is performed, for example, it is possible to cause the user to visually recognize the load in the cutting tool using the two-dimensional shape. Therefore, it is possible to realize an excellent function regarding the state of cutting using the cutting tool.

(17) The processing apparatus is configured to obtain calculation data that is calculated based on a shape of the cutting tool and that includes a plurality of pieces of two-dimensional data, at a plurality of time points, related to the loads in the two directions on the plane perpendicular to the rotation axis, and to perform a process of further displaying a two-dimensional shape indicated by the obtained calculation data.

With such a configuration, for example, the user can compare the two-dimensional shape of the two-dimensional data to be generated when normal and ideal cutting is performed with the two-dimensional shape of the actually generated two-dimensional data.

(18) The processing apparatus is configured to perform a process of further displaying information indicating a degree of similarity between the two-dimensional shape indicated by the measurement data and the two-dimensional shape indicated by the calculation data.

With such a configuration, it is possible to cause the user to recognize the degree of deviation of the two-dimensional shape of the actually generated two-dimensional data from the ideal two-dimensional shape.

(19) The processing apparatus is configured to estimate a cutting condition when the cutting tool is used and to perform a process of further displaying a result of estimation.

With such a configuration, it is possible for the user to check that the cutting condition intended by the user matches the estimated cutting condition.

(20) A processing apparatus according to the embodiment of present disclosure includes a measurement result obtaining unit configured to obtain measurement results from a plurality of sensors, the measurement results being physical quantities each indicating a state related to loads on a cutting tool for milling during cutting, a generation unit configured to generate, based on the measurement results from the respective sensors at a plurality of measurement time points obtained by the measurement result obtaining unit, measurement data that is related to the loads in two directions on a plane perpendicular to a rotation axis of the cutting tool and that includes two-dimensional data at each of the measurement time points, and a display processing unit configured to perform a process of displaying a two-dimensional shape that is indicated by the measurement data generated by the generation unit.

In this manner, with the configuration in which the processing of displaying the two-dimensional shape indicated by the measurement data including the plurality of pieces of two-dimensional data generated based on the measurement results from the plurality of sensors is performed, for example, it is possible to cause the user to visually recognize the load in the cutting tool using the two-dimensional shape. Therefore, it is possible to realize an excellent function regarding the state of cutting using the cutting tool.

(21) A processing method according to the embodiment of present disclosure for a processing apparatus includes obtaining measurement results from a plurality of sensors, the measurement results being physical quantities each indicating a state related to loads on a cutting tool for milling during cutting, generating, based on the obtained measurement results from the respective sensors at a plurality of measurement time points, measurement data that is related to the loads in two directions on a plane perpendicular to a rotation axis of the cutting tool and that includes two-dimensional data at each of the measurement time points, and performing a process of displaying a two-dimensional shape that is indicated by the generated measurement data.

In this manner, by the method of performing the process of displaying the two-dimensional shape indicated by the measurement data including the plurality of pieces of two-dimensional data generated based on the measurement results from the plurality of sensors, for example, it is possible to cause the user to visually recognize the load in the cutting tool using the two-dimensional shape. Therefore, it is possible to realize an excellent function regarding the state of cutting using the cutting tool.

(22) A processing program according to the embodiment of present disclosure for use in a processing apparatus causes a computer to function as a measurement result obtaining unit configured to obtain measurement results from a plurality of sensors, the measurement results being physical quantities each indicating a state related to loads on a cutting tool for milling during cutting, a generation unit configured to generate, based on the measurement results from the respective sensors at a plurality of measurement time points obtained by the measurement result obtaining unit, measurement data that is related to the loads in two directions on a plane perpendicular to a rotation axis of the cutting tool and that includes two-dimensional data at each of the measurement time points, and a display processing unit configured to perform a process of displaying a two-dimensional shape that is indicated by the measurement data generated by the generation unit.

In this manner, with the configuration in which the processing of displaying the two-dimensional shape indicated by the measurement data including the plurality of pieces of two-dimensional data generated based on the measurement results from the plurality of sensors is performed, for example, it is possible to cause the user to visually recognize the load in the cutting tool using the two-dimensional shape. Therefore, it is possible to realize an excellent function regarding the state of cutting using the cutting tool.

Hereinafter, embodiments of the present disclosure will be described with reference to the drawings. In the drawings, the same or corresponding portions are denoted by the same reference signs, and description thereof will not be repeated. Further, at least a part of the embodiments described below may be arbitrarily combined.

[Processing System]

FIG. 1 is a diagram showing a configuration of a processing system according to the embodiment of the present disclosure. Referring to FIG. 1, a processing system 301 includes a cutting tool 101 for milling, a plurality of strain sensors 20, and a processing apparatus 201. Processing system 301 is an example of a display system. Processing apparatus 201 is an example of a processing unit in processing system 301.

[Cutting Tool]

Cutting tool 101 is, for example, an end mill used in a machine tool such as a milling machine, and is used for milling an object to be cut made of metal or the like. Cutting tool 101 is, for example, an indexable end mill. Cutting tool 101 is used while being held by a tool holder 210 such as an arbor.

Cutting tool 101 includes a shaft part 10, a housing 24, a battery 22, a wireless communication device 23, and a blade fitting part 12. Shaft part 10 includes a shank part 11. In FIG. 1, housing 24 is indicated by a two dot chain line which is an imaginary line.

Blade fitting part 12 is provided closer to the distal end than shaft part 10 in cutting tool 101. Blade fitting part 12 includes, for example, four blade fixing parts 13. An insert 14 is attached to each blade fixing part 13. Blade fitting part 12 may be configured to include one, two, or four or more blade fixing parts 13.

Tool holder 210 is attached to a main shaft 220 of the machine tool. Main shaft 220 has a columnar shape and applies a rotational force to tool holder 210. Tool holder 210 is a columnar member disposed on an extension line of main shaft 220. Specifically, an upper end portion of tool holder 210 is held by main shaft 220. In addition, a lower end portion of tool holder 210 holds shank part 11 of cutting tool 101.

For example, a strain sensor 20 may be attached to the peripheral surface of shaft part 10 via an adhesive or a pressure-sensitive adhesive. Strain sensor 20 may be attached to a peripheral surface of tool holder 210.

Housing 24 stores strain sensor 20. Specifically, housing 24 includes a bottom plate portion and a side wall portion (not shown). Housing 24 covers strain sensor 20 from below and from the side.

Battery 22 and wireless communication device 23 are housed in housing 24. For example, battery 22 and wireless communication device 23 are fixed to a bottom plate portion or a side wall portion of housing 24. Wireless communication device 23 includes a communication circuit such as a communication integrated circuit (IC), for example. Battery 22 is connected to strain sensor 20 and wireless communication device 23 via a power line (not shown). Battery 22 supplies power to strain sensor 20 and wireless communication device 23 via a power line. The power line is provided with a switch for switching on and off of power supply.

For example, processing system 301 includes three strain sensors 20. Processing system 301 may be configured to include a smaller number of strain sensors 20 than the number of inserts 14 in cutting tool 101, or may be configured to include a larger number of strain sensors 20 than the number of inserts 14 in cutting tool 101. In addition, processing system 301 may be configured to include a number of strain sensors 20 that is not correlated with the number of inserts 14 in cutting tool 101.

Figure 2:
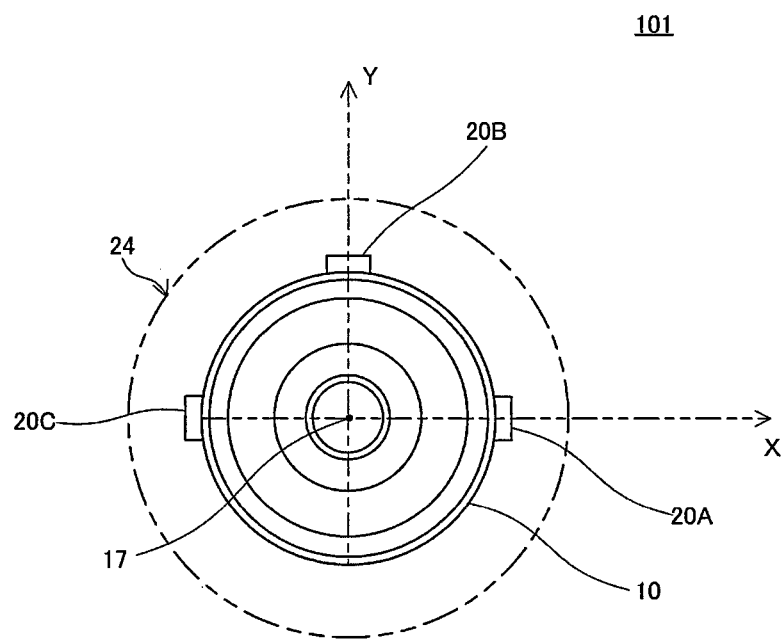
FIG. 2 is a cross-sectional view showing a configuration of a cutting tool according to the embodiment of the present disclosure.

FIG. 2 is a cross-sectional view showing a configuration of the cutting tool according to the embodiment of the present disclosure. FIG. 2 is a cross-sectional view taken along line II-II in FIG. 1. Referring to FIG. 2, strain sensors 20A, 20B, and 20C are provided in shaft part 10 as strain sensors 20. A Strain sensor 20B is provided at a position shifted by 90° from the position at which a strain sensor 20C is provided in the circumferential direction of shaft part 10. A strain sensor 20A is provided at a position shifted by 90° from the position at which strain sensor 20B is provided in the circumferential direction of shaft part 10. Strain sensors 20A and 20C are provided at point-symmetric positions with respect to a rotation axis 17 of shaft part 10. For example, strain sensors 20A, 20B, and 20C may be provided at the same position in a direction along rotation axis 17 of shaft part 10, or may be provided at positions different from each other.

Strain sensors 20A, 20B, and 20C may be provided on the peripheral surface of shaft part 10 or tool holder 210 as described above, for example, regardless of the position of blade fitting part 12. That is, strain sensors 20A, 20B, and 20C do not need to be provided at positions along rotation axis 17 from blade fixing part 13 on the peripheral surface of shaft part 10 or tool holder 210.

Hereinafter, for the sake of description, in a plane orthogonal to rotation axis 17, a direction from rotation axis 17 to a position where strain sensor 20A is provided is referred to as an X direction, and a direction from rotation axis 17 to the position where strain sensor 20B is provided is referred to as a Y direction.

Figure 3:
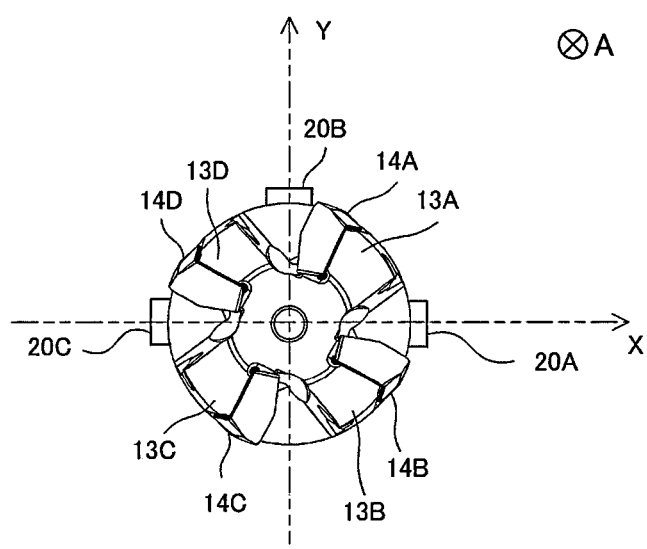
FIG. 3 is an arrow view showing the configuration of the cutting tool according to the embodiment of the present disclosure.

FIG. 3 is an arrow view showing the configuration of the cutting tool according to the embodiment of the present disclosure. FIG. 3 is an arrow view seen from the direction III in FIG. 1. Referring to FIG. 3, blade fitting part 12 includes blade fixing parts 13A, 13B, 13C, and 13D as blade fixing part 13. Blade fixing parts 13A, 13B, 13C, and 13D are provided in this order at positions shifted by 90° in the clockwise direction in the circumferential direction of blade fitting part 12. Inserts 14A, 14B, 14C, and 14D are attached to blade fixing parts 13A, 13B, 13C, and 13D as inserts 14, respectively. Each insert 14A, 14B, 14C, and 14D has a cutting edge.

Insert 14 is, for example, an indexable insert. Insert 14 is attached to blade fixing part 13 by screwing, for example. Note that insert 14 may be fixed to blade fixing part 13 by means other than screwing. In addition, cutting tool 101 may be a so-called solid end mill including a cutting blade integrated with shaft part 10 instead of blade fitting part 12.

Strain sensor 20 measures a physical quantity indicating a state related to a load of cutting tool 101 during cutting. More specifically, strain sensor 20 measures the shear strain ε of shaft part 10 as a physical quantity indicating a state related to a load of cutting tool 101 during cutting.

For example, strain sensor 20 measures the shear strain ε in a period from a time ts, which is a start time of cutting, to a time te, which is an end time of cutting, and transmits an analog signal having a level corresponding to the shear strain ε to wireless communication device 23 via a signal line (not illustrated).

Wireless communication device 23 performs analog-to-digital (AD) conversion on the analog signal received from strain sensor 20 at a predetermined sampling period, and generates a sensor measurement value that is a digital value after the conversion. More specifically, wireless communication device 23 generates a sensor measurement value sx by performing AD conversion on an analog signal of the shear strain ε received from strain sensor 20A, generates a sensor measurement value sy by performing AD conversion on an analog signal of the shear strain ε received from strain sensor 20B, and generates a sensor measurement value sr by performing AD conversion on an analog signal of the shear strain ε received from strain sensor 20C.

Wireless communication device 23 adds a time stamp indicating a sampling timing to the generated sensor measurement values sx, sy, and sr, and stores the sensor measurement values sx, sy, and sr to which the time stamps are added in a storage unit (not illustrated). Wireless communication device 23 obtains one or a plurality of sets of the sensor measurement values sx, sy, and sr from the storage unit in a predetermined cycle, for example, generates a wireless signal including the obtained sensor measurement values sx, sy, and sr and identification information of corresponding strain sensor 20, and transmits the generated wireless signal to processing apparatus 201.

[Processing Apparatus]

Figure 4:
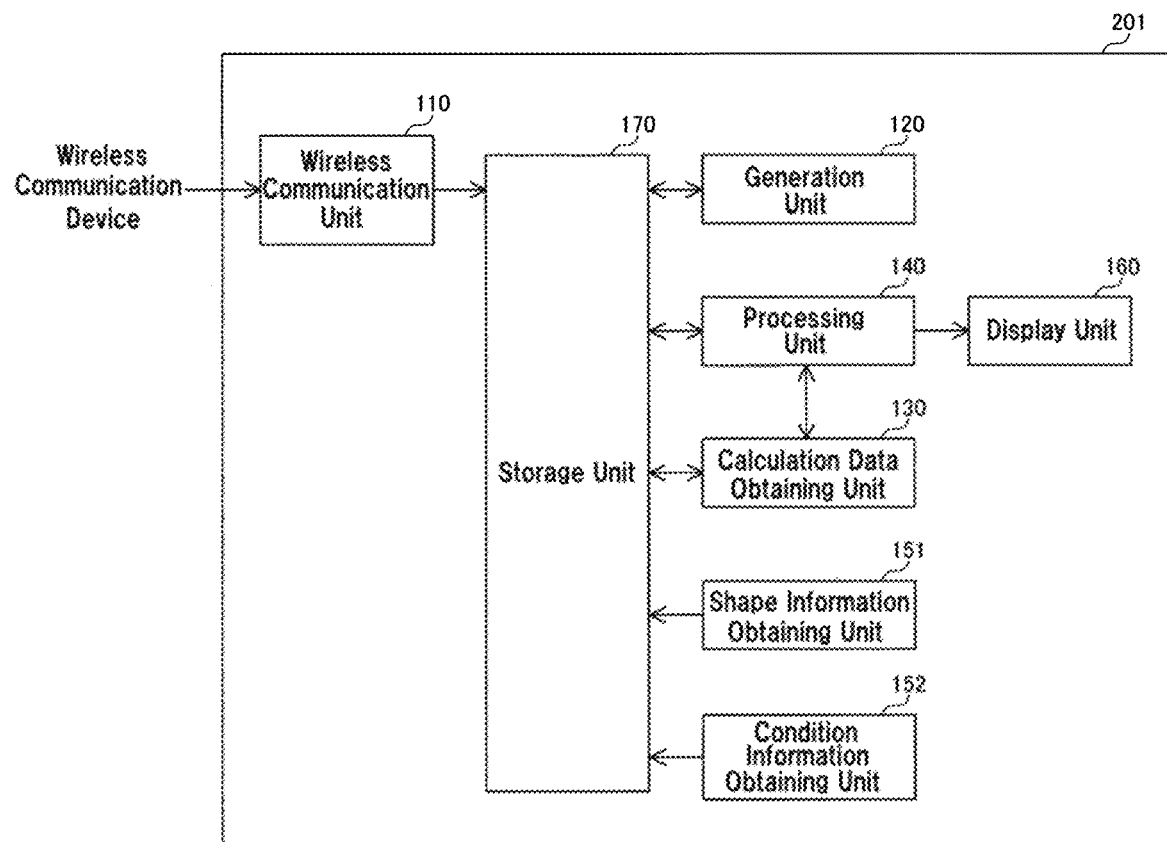
FIG. 4 is a diagram showing a configuration of a processing apparatus in a cutting system according to the embodiment of the present disclosure.

FIG. 4 is a diagram showing a configuration of a processing apparatus in a cutting system according to the embodiment of the present disclosure. Referring to FIG. 4, processing apparatus 201 includes a wireless communication unit 110, a generation unit 120, a calculation data obtaining unit 130, a processing unit 140, a shape information obtaining unit 151, a condition information obtaining unit 152, a display unit 160, and a storage unit 170. Wireless communication unit 110 is an example of a measurement result obtaining unit. Processing unit 140 is an example of a determination unit and an example of a display processing unit.

Wireless communication unit 110 is provided with a communication circuit such as a communication IC, for example. Generation unit 120, calculation data obtaining unit 130, processing unit 140, shape information obtaining unit 151, and condition information obtaining unit 152 are provided with a processor such as a central processing unit (CPU) and a digital signal processor (DSP), for example. Storage unit 170 is, for example, a nonvolatile memory. Display unit 160 is, for example, a display. Note that display unit 160 may be provided outside processing apparatus 201.

<Shape Information Obtaining Unit>

Shape information obtaining unit 151 obtains shape information indicating the shape of cutting tool 101 used for cutting. More specifically, shape information obtaining unit 151 obtains shape information indicating a tool diameter, a number of blades which is the number of inserts 14, a helix angle, an insert pitch which is an angular interval of inserts 14 around rotation axis 17, and a gash. Here, the tool diameter is a diameter of a circumscribed circle of the cutting edge of insert 14, and is also referred to as an outside diameter or an edge diameter. For example, shape information obtaining unit 151 obtains the shape information from CAM (Computer Aided Manufacturing), which is software for creating a machining program of a machine tool, and stores the obtained shape information in storage unit 170.

<Condition Information Obtaining Unit>

Condition information obtaining unit 152 obtains condition information indicating a cutting condition in cutting using cutting tool 101. More specifically, condition information obtaining unit 152 obtains the condition information indicating the axial cutting amount and the radial cutting amount. For example, condition information obtaining unit 152 obtains the condition information from the CAM before the start of cutting, and stores the obtained condition information in storage unit 170.

<Wireless Communication Unit>

Wireless communication unit 110 obtains a measurement result from strain sensor 20, the measurement result being a physical quantity indicating a state related to a load of cutting tool 101 during cutting.

More specifically, wireless communication unit 110 performs wireless communication with wireless communication device 23 in cutting tool 101. Wireless communication device 23 and wireless communication unit 110 perform wireless communication using a communication protocol such as ZigBee® compliant with IEEE802.15.4, Bluetooth® compliant with IEEE802.15.1, and UWB (Ultra Wide Band) compliant with IEEE802. 15. 3a. A communication protocol other than the above may be used between wireless communication device 23 and wireless communication unit 110.

Wireless communication unit 110 obtains the sensor measurement values sx, sy, and sr and the identification information from the wireless signal received from wireless communication device 23 in cutting tool 101. Then, wireless communication unit 110 stores the sensor measurement values sx, sy, and sr in storage unit 170 in association with the identification information.

<Generation Unit>

Generation unit 120 generates measurement data MD including two-dimensional data for each measurement time point regarding loads in two directions in a plane perpendicular to rotation axis 17 based on measurement results from each strain sensor 20 at a plurality of measurement time points obtained by wireless communication unit 110.

More specifically, generation unit 120 generates the two-dimensional data based on the sensor measurement values sx, sy, and sr stored in storage unit 170 by wireless communication unit 110.

Figure 5:
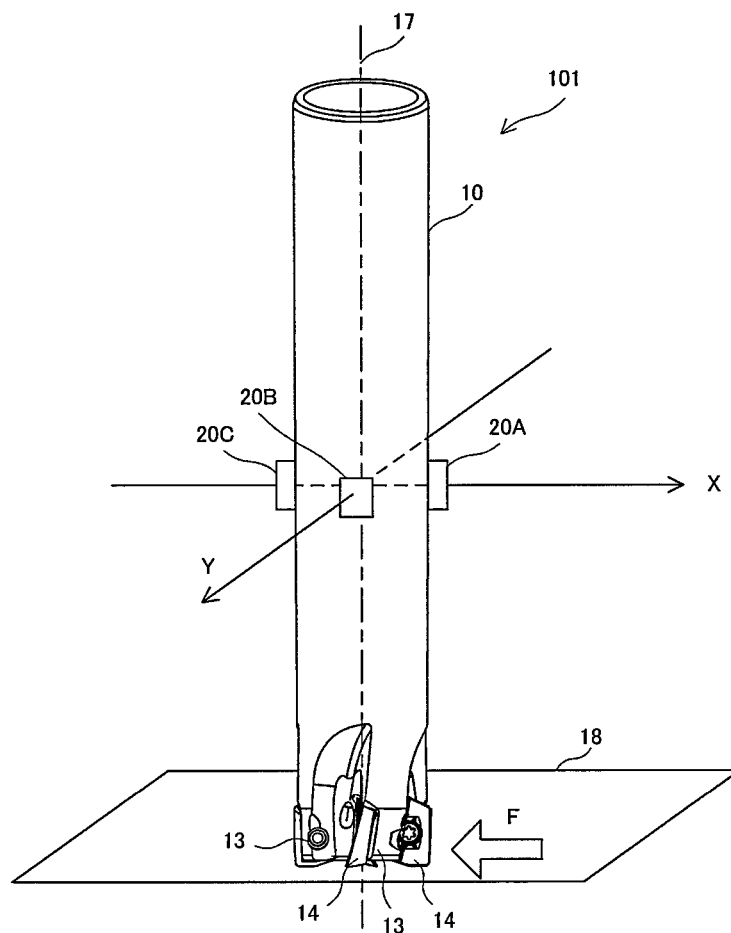
FIG. 5 is a perspective view schematically showing the cutting tool according to the embodiment of the present disclosure.

FIG. 5 is a perspective view schematically showing the cutting tool according to the embodiment of the present disclosure. Referring to FIG. 5, when cutting is performed by cutting tool 101, a load, that is, a cutting force F [N], is applied from the cutting object to the cutting edge in a cutting force exertion plane 18 which is a plane perpendicular to rotation axis 17 and which passes through the cutting edge of insert 14.

For example, generation unit 120 generates two-dimensional data indicating a load Fx in the X direction and a load Fy in the Y direction received by cutting tool 101 in cutting force exertion plane 18 based on the sensor measurement values sx, sy, and sr.

More specifically, storage unit 170 stores conversion formulas for converting the sensor measurement values sx, sy, and sr into the loads Fx, Fy, and Fz. For example, these conversion formulas are prepared in advance using the techniques described in PTL 3 and PTL 4, etc. More specifically, these conversion formulas are conversion matrices created in advance based on the sensor measurement values sx, sy, and sr obtained when a known load is applied to cutting tool 101.

Generation unit 120 generates two-dimensional data indicating the loads Fx and Fy based on the sensor measurement values sx, sy, and sr and the conversion matrix in storage unit 170. Generation unit 120 may be configured to generate the shear strain ε at the position where strain sensor 20A is provided and the two-dimensional data indicating the shear strain ε at the position where the strain sensor 20B is provided, based on the sensor measurement values sx, sy, and sr.

Generation unit 120 generates a plurality of pieces of two-dimensional data in a target period T based on a plurality of sensor measurement values sx, sy, and sr in the target period T starting from time (P×m) at a generation timing according to a generation cycle P. Here, m is a positive integer. The generation cycle P may be the same as the target period T, and each target period T may be continuous. In addition, the generation cycle P may be shorter than the target period T, and each target period T may partially overlap each other. Further, the generation cycle P may be longer than the target period T, and each target period T may be intermittently provided.

For example, generation unit 120 generates the measurement data MD including two-dimensional data corresponding to a plurality of measurement time points in a period required for cutting tool 101 to make a plurality of rotations. More specifically, the target period T is a period required for cutting tool 101 to make a plurality of rotations.

Generation unit 120 generates the measurement data MD composed of a plurality of pieces of two-dimensional data for each target period T at a generation timing according to the generation cycle P, and stores the generated measurement data MD in storage unit 170 in association with the target period T.

Figure 6:
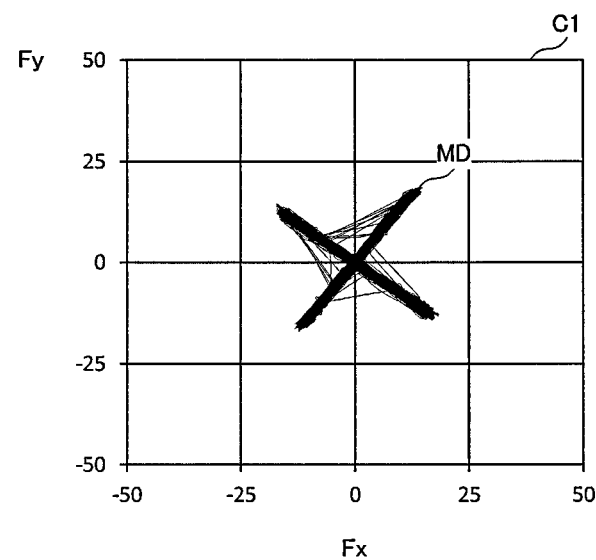
FIG. 6 is a diagram showing an example of measurement data generated by a generation unit in the processing apparatus according to the embodiment of the present disclosure.
Figure 7:
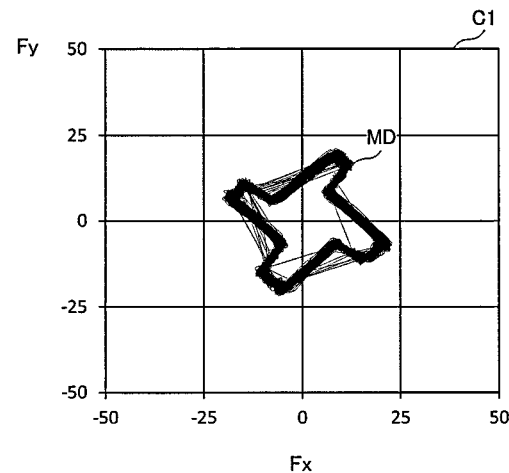
FIG. 7 is a diagram showing an example of measurement data generated by the generation unit in the processing apparatus according to the embodiment of the present disclosure.
Figure 8:
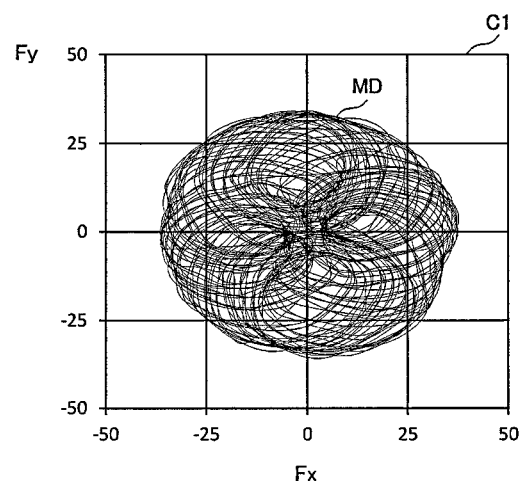
FIG. 8 is a diagram showing an example of measurement data generated by the generation unit in the processing apparatus according to the embodiment of the present disclosure.

FIGS. 6 to 8 are diagram showing examples of measurement data generated by the generation unit in the processing apparatus according to the embodiment of the present disclosure. FIGS. 6 to 8 show the measurement data MD generated by generation unit 120 when cutting is performed by setting a radial direction cutting amount ae to A1, A2, and A3, respectively, using cutting tool 101 having "4" blades, on a two-dimensional coordinate C1 in which the vertical axis represents the load Fy [N], the horizontal axis represents the load Fx [N], and the origin corresponds to rotation axis 17. Here, A1<A2<A3.

Referring to FIGS. 6 to 8, a two-dimensional shape SMD indicated by the measurement data MD generated by generation unit 120 becomes closer to a circle as a radial direction cutting amount ae at the time of cutting is larger. This is because, when cutting tool 101 having the same tool diameter is used, the number of inserts 14 simultaneously acting on the object to be cut, that is, the number of simultaneously acting blade increases as the radial direction cutting amount ae during cutting increases.

Specifically, for example, when cutting is performed with the radial cutting amount ae set to A1, the number of simultaneously acting blades is always one. In this case, as shown in FIG. 6, the measurement data MD generated by generation unit 120 indicates a substantially cross-shaped two-dimensional shape SMD corresponding to the number of blades. On the other hand, for example, when cutting is performed with the radial cutting amount ae set to A3, the number of simultaneously acting blades is always two or three. In this case, as shown in FIG. 8, the measurement data MD generated by generation unit 120 indicates the two-dimensional shape SMD having a substantially circular shape. As described above, the measurement data MD generated by generation unit 120 indicates the two-dimensional shape SMD corresponding to the cutting condition such as the radial cutting amount ae.

For example, generation unit 120 generates the measurement data MD in which the rotation angle of two pieces of two-dimensional data adjacent to each other around rotation axis 17 is 5° or less. More specifically, the rotation angle about the origin of two of pieces two-dimensional data adjacent to each other in the two-dimensional coordinate C1 is 5° or less. The rotation angle is preferably 2° or less, and more preferably 1° or less.

Figure 9:
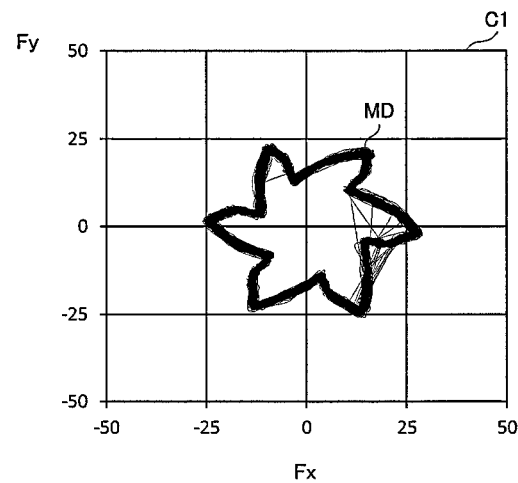
FIG. 9 is a diagram showing another example of measurement data generated by the generation unit in the processing apparatus according to the embodiment of the present disclosure.
Figure 10:
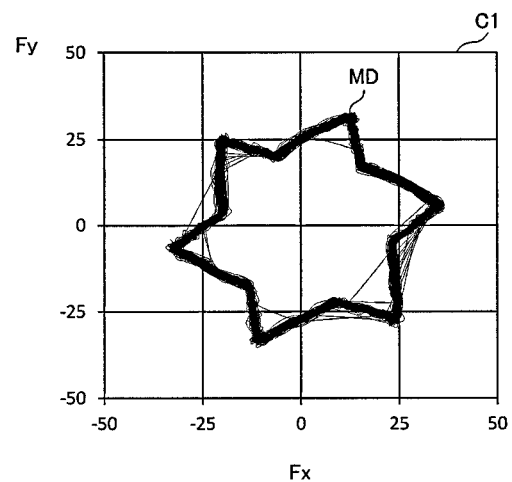
FIG. 10 is a diagram showing another example of measurement data generated by the generation unit in the processing apparatus according to the embodiment of the present disclosure.
Figure 11:
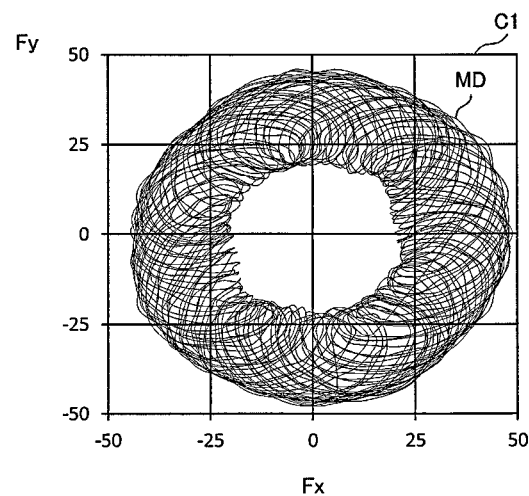
FIG. 11 is a diagram showing another example of measurement data generated by the generation unit in the processing apparatus according to the embodiment of the present disclosure.

FIGS. 9 to 11 are diagrams showing other examples of measurement data generated by the generation unit in the processing apparatus according to the embodiment of the present disclosure. FIGS. 9 to 11 show the measurement data MD generated by generation unit 120 on the two-dimensional coordinate C1 when cutting is performed by setting the radial direction cutting amount ae to B1, B2, and B3, respectively, using cutting tool 101 having "6" blades. Here, B1<B2<B3.

Referring to FIGS. 9 to 11, similarly to FIGS. 6 to 8, the two-dimensional shape SMD indicated by the measurement data MD generated by generation unit 120 becomes closer to a circle as the radial direction cutting amount ae at the time of cutting is larger.

Referring to FIGS. 9 and 10, the measurement data MD generated by generation unit 120 indicates the two-dimensional shape SMD having a substantially star-shaped hexagonal shape corresponding to the number of blades. In this way, the measurement data MD generated by generation unit 120 indicates the two-dimensional shape SMD corresponding to the shape of cutting tool 101 such as the number of blades.

<Calculation Data Obtaining Unit>

Calculation data obtaining unit 130 obtains a calculation data CD including a plurality of pieces of two-dimensional data related to loads in two directions in a plane perpendicular to rotation axis 17 at a plurality of time points during cutting, which are calculated based on the shape of cutting tool 101.

More specifically, calculation data obtaining unit 130 obtains the calculation data CD including a plurality of pieces of two-dimensional data indicating a cutting area vector Vd in cutting force exertion plane 18 calculated in advance by simulation using the shape of cutting tool 101 and the cutting condition.

Figure 12:
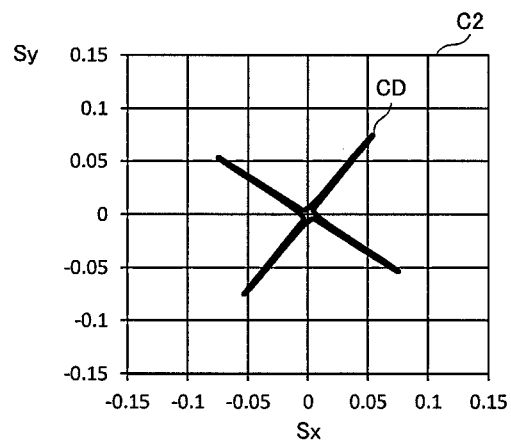
FIG. 12 is a diagram showing an example of calculation data obtained by a calculation data obtaining unit in the processing apparatus according to the embodiment of the present disclosure.
Figure 13:
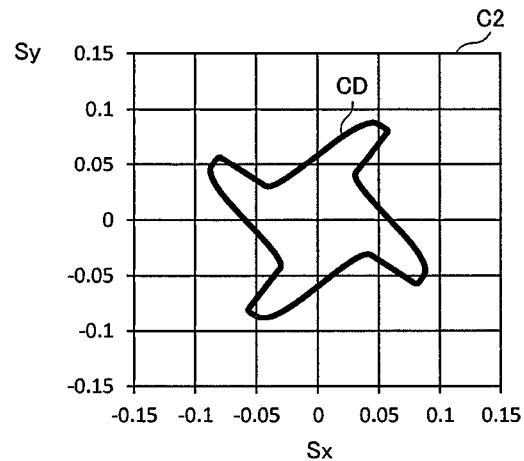
FIG. 13 is a diagram showing an example of calculation data obtained by the calculation data obtaining unit in the processing apparatus according to the embodiment of the present disclosure.
Figure 14:
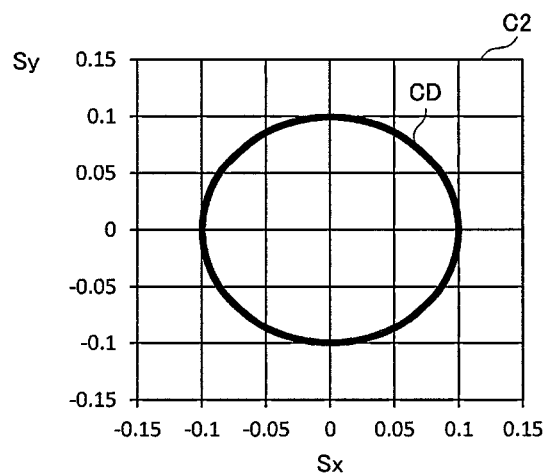
FIG. 14 is a diagram showing an example of calculation data obtained by the calculation data obtaining unit in the processing apparatus according to the embodiment of the present disclosure.

FIGS. 12 to 14 are diagrams showing examples of calculation data obtained by the calculation data obtaining unit in the processing apparatus according to the embodiment of the present disclosure. FIGS. 12 to 14 show the calculation data CD indicating the cut area vector Vd when cutting is performed under the same cutting conditions using same cutting tool 101 as when the measurement data MD shown in FIGS. 6 to 8 is generated, on a two-dimensional coordinate C2 in which the vertical axis represents a cut area Sy [mm^2] in the Y-direction, the horizontal axis represents a cut area Sx [mm^2] in the X-direction, and the origin corresponds to rotation axis 17. Here, "a^b" means that a raised to the power of b.

Referring to FIGS. 12 to 14, a two-dimensional shape SCD indicated by the calculation data CD obtained by calculation data obtaining unit 130 becomes closer to a circle as the radial direction cutting amount ae at the time of cutting is larger, similarly to the two-dimensional shape SMD indicated by the measurement data MD in FIGS. 6 to 8. Referring to FIG. 12, the calculation data CD obtained by calculation data obtaining unit 130 shows the two-dimensional shape SCD having a substantially cross shape corresponding to the number of blades, similarly to the measurement data MD shown in FIG. 6.

For example, calculation data obtaining unit 130 obtains the calculation data CD in which a rotation angle between two pieces of two-dimensional data adjacent to each other around rotation axis 17 is 2° or less. More specifically, a rotation angle about the origin of two pieces of two-dimensional data adjacent to each other in the two-dimensional coordinate C2 is 2° or less. For example, calculation data obtaining unit 130 may obtain the calculation data CD which is a set of continuous two-dimensional data.

Figure 15:
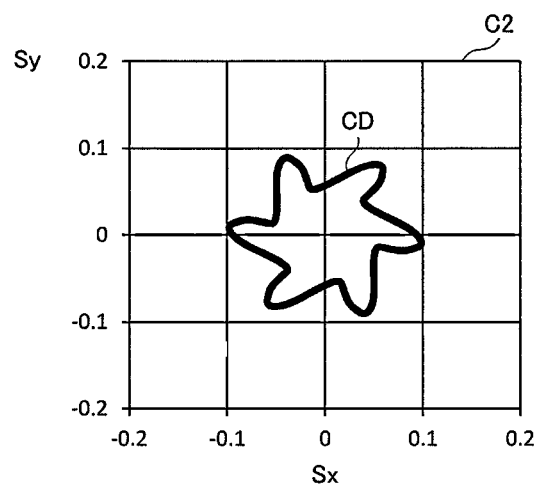
FIG. 15 is a diagram showing another example of calculation data obtained by the calculation data obtaining unit in the processing apparatus according to the embodiment of the present disclosure.
Figure 16:
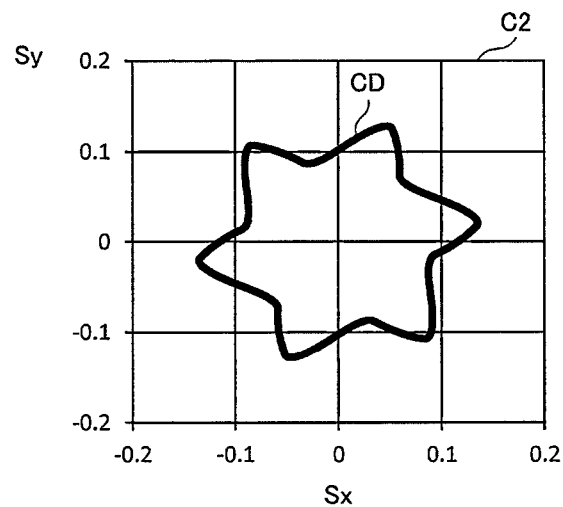
FIG. 16 is a diagram showing another example of the calculation data obtained by the calculation data obtaining unit in the processing apparatus according to the embodiment of the present disclosure.
Figure 17:
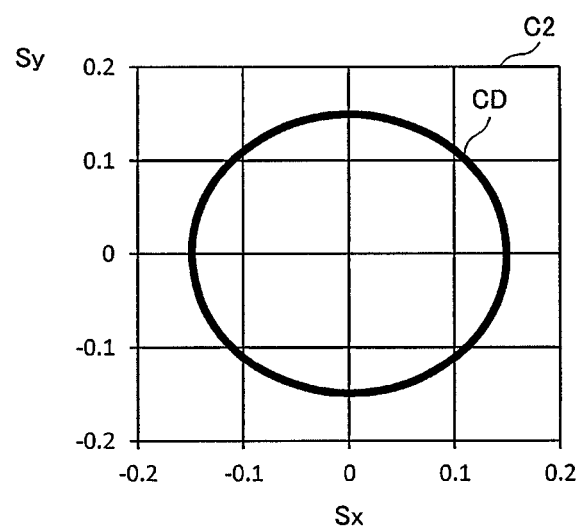
FIG. 17 is a diagram showing another example of calculation data obtained by the calculation data obtaining unit in the processing apparatus according to the embodiment of the present disclosure.

FIGS. 15 to 17 are diagrams showing other examples of calculation data obtained by the calculation data obtaining unit in the processing apparatus according to the embodiment of the present disclosure. FIGS. 15 to 17 show, on the two-dimensional coordinate C2, the calculation data CD indicating the cutting-area vectors Vd when cutting is performed under the same cutting conditions using same cutting tool 101 as that used when the measurement data MD shown in FIGS. 9 to 11 are generated.

Referring to FIGS. 15 to 17, the two-dimensional shape SCD indicated by the calculation data CD obtained by calculation data obtaining unit 130 becomes closer to a circle as the radial direction cutting amount ae at the time of cutting is larger, similarly to the two-dimensional shape SMD indicated by the measurement data MD in FIGS. 9 to 11. Referring to FIGS. 15 and 16, the calculation data CD obtained by calculation data obtaining unit 130 indicates the two-dimensional shape SCD having a substantially star-shaped hexagonal shape corresponding to the number of blades, similarly to the measurement data MD shown in FIGS. 9 and 10.

For example, storage unit 170 stores a plurality of pieces of the calculation data CD. Calculation data obtaining unit 130 obtains the calculation data CD from storage unit 170.

Figures 18, 19:
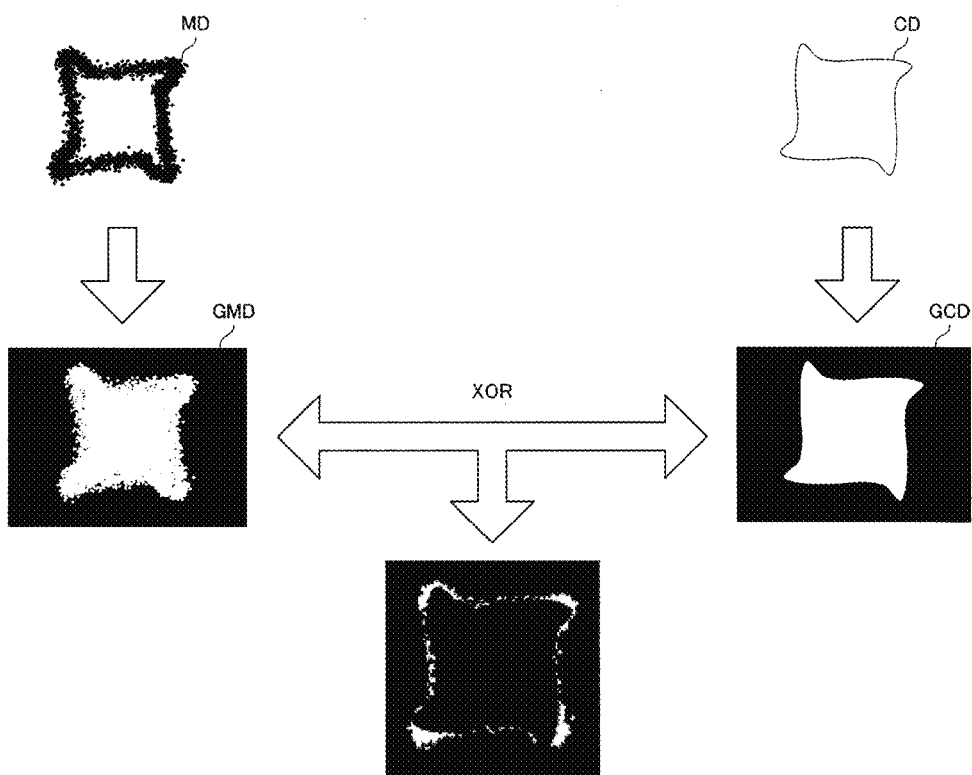
FIG. 18 is a diagram showing an example of a database in a storage unit of the processing apparatus according to the embodiment of the present disclosure.
FIG. 19 is a diagram showing an example of a method of calculating a degree of difference by the processing unit in the processing apparatus according to the embodiment of the present disclosure.

FIG. 18 is a diagram showing an example of a database in the storage unit of the processing apparatus according to the embodiment of the present disclosure. Referring to FIG. 18, storage unit 170 stores a database DB indicating a correspondence relationship between the shape and cutting condition of cutting tool 101 and the calculation data CD.

More specifically, the administrator of processing system 301 calculates a cutting area vector Vch in cutting force exertion plane 18 for each insert 14 at the time of cutting using cutting tool 101 using the above-described shape information and the condition information and an instantaneous cutting force model described in Non-PTL 1 or the like. Then, the administrator calculates the total sum of the calculated cutting area vectors Vch for each insert 14 as the cutting area vector Vd. The administrator calculates the cutting area vector Vd for each shape and cutting condition of cutting tool 101, generates the database DB indicating the correspondence relationship between the calculation data CD indicating the calculated cutting area vector Vd and the shape and cutting condition of cutting tool 101, and stores the generated database DB in storage unit 170.

For example, processing unit 140 outputs a calculation data request indicating that the calculation data CD in the target period T is to be obtained to calculation data obtaining unit 130.

Calculation data obtaining unit 130 receives the calculation data request from processing unit 140, and obtains shape information indicating the shape of cutting tool 101 used for cutting in the target period T from storage unit 170. Then, calculation data obtaining unit 130 obtains a plurality of pieces of the calculation data CD corresponding to the shape indicated by the shape information from the database DB in storage unit 170.

As an example, calculation data obtaining unit 130 obtains shape information indicating that the shape of cutting tool 101 used for cutting in the target period T is a shape a from storage unit 170. Then, calculation data obtaining unit 130 obtains calculation data CDaw, CDax, CDay, CDaz, . . . corresponding to the shape information from the database DB in storage unit 170.

For example, calculation data obtaining unit 130 obtains the calculation data CD calculated further based on the cutting condition using cutting tool 101. More specifically, calculation data obtaining unit 130 receives a calculation data request from processing unit 140, and obtains shape information indicating the shape of cutting tool 101 used for cutting in the target period T and the condition information indicating the cutting condition in the target period T from storage unit 170. Then, calculation data obtaining unit 130 obtains one piece of calculation data CD corresponding to the shape information and the condition information from the database DB in storage unit 170.

As an example, calculation data obtaining unit 130 obtains shape information indicating that the shape of cutting tool 101 used for cutting in the target period T is a shape b and condition information indicating that the cutting condition in the target period T is a condition x from storage unit 170. Then, calculation data obtaining unit 130 obtains calculation data CDbx corresponding to the shape information and the condition information from the database DB in storage unit 170.

Calculation data obtaining unit 130 outputs the obtained one or more pieces of the calculation data CD to processing unit 140 as a response to the calculation data request received from processing unit 140.

<Processing Unit>

Processing unit 140 performs a determination process related to cutting using cutting tool 101 based on the two-dimensional shape SMD indicated by the measurement data MD generated by generation unit 120. For example, processing unit 140 may perform a determination process regarding cutting using cutting tool 101 further based on the two-dimensional shape SCD indicated by the calculation data CD obtained by calculation data obtaining unit 130.

More specifically, when generation unit 120 stores the measurement data MD in the target period T in storage unit 170, processing unit 140 outputs a calculation data request indicating that the calculation data CD in the target period T is to be obtained to calculation data obtaining unit 130. As described above, calculation data obtaining unit 130 outputs one or more pieces of the calculation data CD to processing unit 140 as a response to the calculation data request. Processing unit 140 receives one or more pieces of the calculation data CD in the target period T from calculation data obtaining unit 130, obtains measurement data MD in the target period T in storage unit 170, and performs a determination process based on the two-dimensional shape SCD indicated by one or more pieces of calculation data CD received from calculation data obtaining unit 130 and the two-dimensional shape SMD indicated by the obtained measurement data MD.

For example, processing unit 140 calculates a degree of difference D1 between the two-dimensional shape SCD and the two-dimensional shape SMD using an image processing technology, and performs a determination process based on the calculated degree of difference D1. Here, as the degree of difference D1 is higher, a degree of similarity between the two-dimensional shape SCD and the two-dimensional shape SMD is lower, and as the degree of difference D1 is lower, the degree of similarity between the two-dimensional shape SCD and the two-dimensional shape SMD is higher.

FIG. 19 is a diagram showing an example of a method of calculating the degree of difference by the processing unit in the processing apparatus according to the embodiment of the present disclosure. Referring to FIG. 19, processing unit 140 generates a binary image GMD in which a plot of the two-dimensional data in the measurement data MD in the target period T and a region surrounded by the two-dimensional shape SMD indicated by the measurement data MD are white and a region outside the two-dimensional shape SMD is black. In addition, processing unit 140 generates a binary image GCD in which a region surrounded by the two-dimensional shape SCD indicated by the calculation data CD in the target period T received from calculation data obtaining unit 130 is white and a region outside the two-dimensional shape SCD is black.

Processing unit 140 calculates areas of portions where colors do not match in the binary image GMD and the binary image GCD as the degree of difference D1. Specifically, processing unit 140 calculates, as the degree of difference D1, XORsum, which is a sum of exclusive ORs XOR of corresponding pixels in the binary image GMD and the binary image GCD.

For example, processing unit 140 performs an image adjustment process of adjusting the magnification of the size of the white region in the binary image GCD and the phases around the center so that the sum XORsum calculated based on the binary image GMD and the binary image GCD becomes smaller, and determines the smallest value of the calculated sum XORsum as the degree of difference D1.

Here, the calculation data CD does not indicate the absolute value of the cutting force, but indicates the cutting area vector Vd as described above. Thus, the size of the calculation data CD on the two-dimensional coordinate C2 is different from the size of the measurement data MD on the two-dimensional coordinate C1. Further, the phases of the calculation data CD around the origin of the two-dimensional coordinates C2 may be different from the phases of the measurement data MD around the origin of the two-dimensional coordinates C1.

On the other hand, according to the configuration in which processing unit 140 performs the image adjustment processing and determines the smallest value of the calculated total values XORsum as the degree of difference D1, the degree of difference D1 can be calculated at least as an indicator indicating the difference between the geometric shape of the calculation data CD and the geometric shape of the measurement data MD.

(Condition Determination Process)

Processing unit 140 may perform a condition determination process that is a determination process regarding a cutting condition of cutting using cutting tool 101.

More specifically, processing unit 140 receives, from calculation data obtaining unit 130, a plurality of pieces of the calculation data CD in the target period T obtained by calculation data obtaining unit 130 based on the shape information. Processing unit 140 calculates the degree of difference D1 between the two-dimensional shape SCD indicated by the plurality of pieces of the calculation data CD and the two-dimensional shape SMD indicated by the measurement data MD in the target period T respectively, and estimates the cutting condition using cutting tool 101 based on each calculated degree of difference D1.

Figure 20:
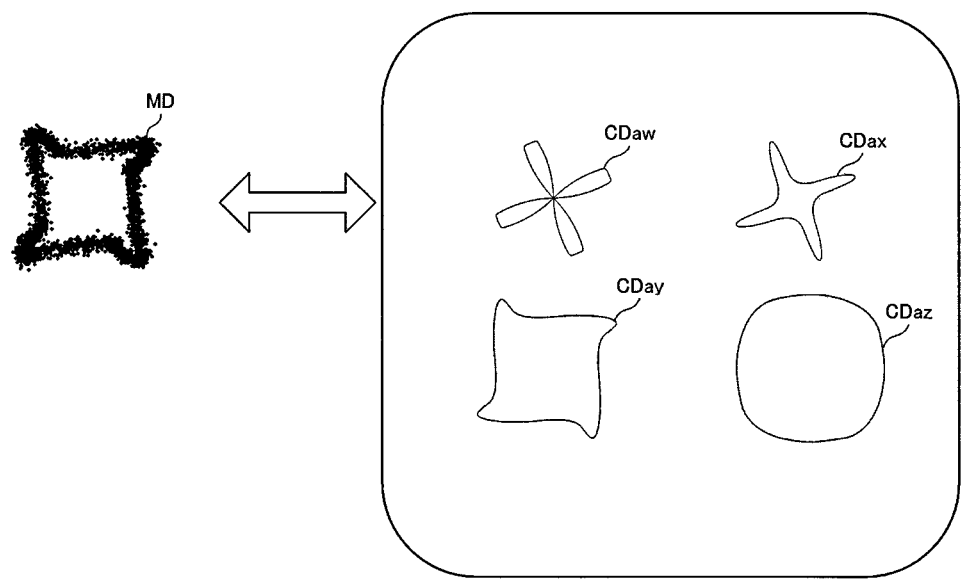
FIG. 20 is a diagram showing an example of a condition determination process by the processing unit in the processing apparatus according to the embodiment of the present disclosure.

FIG. 20 is a diagram showing an example of the condition determination process by the processing unit in the processing apparatus according to the embodiment of the present disclosure. FIG. 20 shows the measurement data MD and calculation data CDaw, CDax, CDay, and CDaz.

Referring to FIG. 20, for example, processing unit 140 receives the calculation data CDaw, CDax, CDay, and CDaz from calculation data obtaining unit 130 as the plurality of pieces of the calculation data CD in the target period T. Processing unit 140 calculates the degree of difference D1 between the two-dimensional shape SMD indicated by the measurement data MD in the target period T and each two-dimensional shape SCD indicated by the calculation data CDaw, CDax, CDay, and CDaz received from calculation data obtaining unit 130 using the above-described calculation method.

For example, processing unit 140 specifies a similar calculation data CDsim that is the calculation data CD corresponding to the two-dimensional shape SCD in which the degree of difference D1 from the two-dimensional shape SMD has the smallest value and is equal to or less than a predetermined threshold value Tha. For example, processing unit 140 specifies a calculation data CDay as the similar calculation data CDsim.

Referring again to FIG. 18, processing unit 140 obtains the cutting condition corresponding to the identified similar calculation data CDsim from the database DB in storage unit 170. Specifically, processing unit 140 obtains a cutting condition y corresponding to the calculation data CDay which is the similar calculation data CDsim. Then, processing unit 140 estimates the actual cutting condition in the cutting based on the obtained cutting condition y.

For example, processing unit 140 estimates that an axial direction cutting amount in an actual cutting condition is an axial direction cutting amount apy indicated by the cutting condition y. Further, for example, processing unit 140 estimates that an radial direction cutting amount in an actual cutting condition is an radial direction cutting amount aey indicated by the cutting condition y. Processing unit 140 stores the estimation information indicating an estimation result in storage unit 170 in association with the target period T.

On the other hand, for example, when all the calculated degrees of difference D1 are larger than the threshold value Tha, processing unit 140 determines that the similar calculation data CDsim does not exist. In this case, processing unit 140 determines that an abnormality has occurred in cutting, and stores determination information indicating the determination result in storage unit 170 in association with the target period T.

(Anomaly Determination Process)

Processing unit 140 performs an abnormality determination process, which is a determination process regarding an abnormality of cutting using cutting tool 101, based on a result of comparing a two-dimensional shape SMD1 indicated by measurement data MD1 including a plurality of pieces of two-dimensional data corresponding to a plurality of measurement time points in a target period T1 with a two-dimensional shape SCD1 indicated by a calculation data CD1 calculated based on a cutting condition in the target period T1. The target period T1 is an example of a first period. The measurement data MD1 is an example of first measurement data. The calculation data CD1 is an example of first calculation data.

For example, processing unit 140 may perform the abnormality determination process based on the two-dimensional shape SCD indicated by the different calculation data CD for each cutting condition.

More specifically, processing unit 140 receives, from calculation data obtaining unit 130, one calculation data CD1 in the target period T1 obtained by calculation data obtaining unit 130 based on the shape information and the condition information. Processing unit 140 calculates the degree of difference D1 between the two-dimensional shape SCD1 indicated by the calculation data CD1 and the two-dimensional shape SMD1 indicated by the measurement data MD1 in the target period T1, and detects an abnormality related to the setting of cutting tool 101, an abnormality related to the object to be cut, and various abnormalities such as loss and wear of insert 14 based on the calculated degree of difference D1. For example, processing unit 140 compares the calculated degree of difference D1 with a predetermined threshold value Th1, and detects various abnormalities based on the comparison result.

Figure 21:
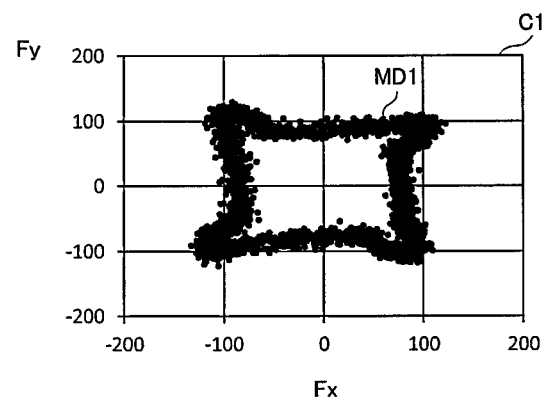
FIG. 21 is a diagram showing an example of measurement data generated by the generation unit in the processing apparatus according to the embodiment of the present disclosure.
Figure 22:
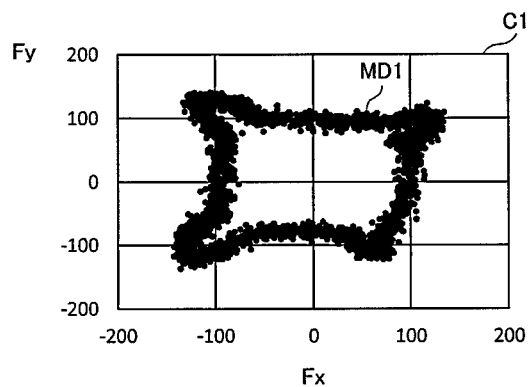
FIG. 22 is a diagram showing an example of measurement data generated by the generation unit in the processing apparatus according to the embodiment of the present disclosure.

FIGS. 21 and 22 are diagrams showing examples of measurement data generated by the generation unit in the processing apparatus according to the embodiment of the present disclosure. FIG. 21 shows the measurement data MD1 in a target period T1A, which is the target period T1 in a state where no loss of insert 14 occurs, on the two-dimensional coordinate C1. FIG. 22 shows the measurement data MD1 in a target period T1B, which is the target period T1 after the target period T1A in a state where loss of insert 14 has occurred, on the two-dimensional coordinate C1. Referring to FIGS. 21 and 22, before and after loss of insert 14 occurs, a slight change occurs in the two-dimensional shape SMD1 indicated by the measurement data MD1 generated by generation unit 120.

Figure 23:
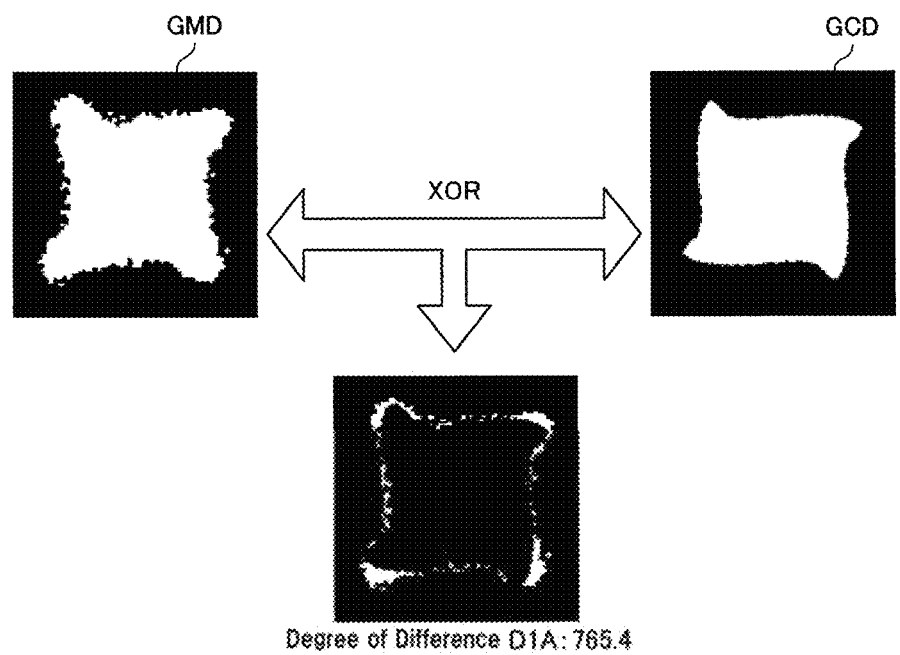
FIG. 23 is a diagram showing an example of a calculation result of a degree of difference by the processing unit in the processing apparatus according to the embodiment of the present disclosure.
Figure 24:
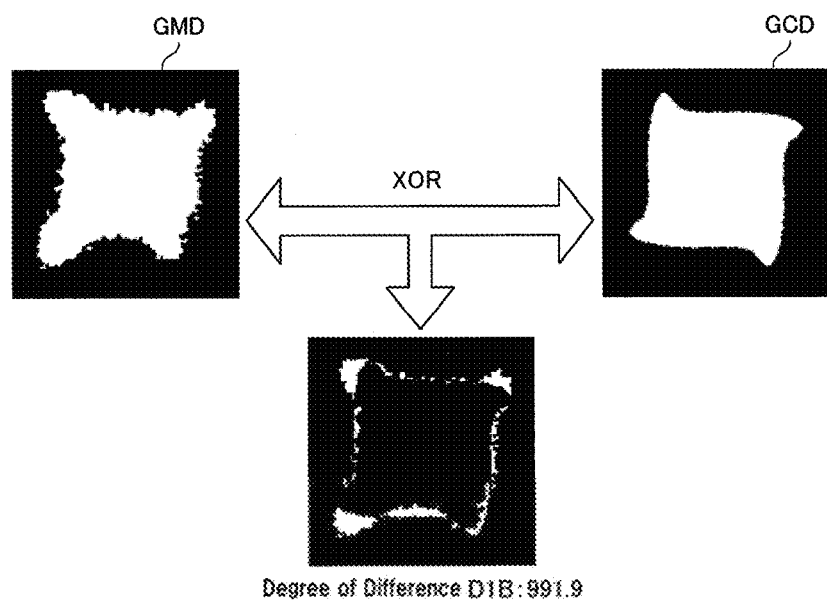
FIG. 24 is a diagram showing an example of a calculation result of a degree of difference by the processing unit in the processing apparatus according to the embodiment of the present disclosure.

FIGS. 23 and 24 are diagrams showing examples of calculation results of degrees of difference by the processing unit in the processing apparatus according to the embodiment of the present disclosure. FIG. 23 shows a calculation result of a degree of difference D1A which is the degree of difference D1 between the two-dimensional shape SMD1 indicated by the measurement data MD1 and the two-dimensional shape SCD1 indicated by the calculation data CD1 in the target period T1A shown in FIG. 21. FIG. 24 shows a calculation result of a degree of difference D1B which is the degree of difference D1 between the two-dimensional shape SMD1 indicated by the measurement data MD1 and the two-dimensional shape SCD1 indicated by the calculation data CD1 in the target period T1B shown in FIG. 22.

Referring to FIG. 23, processing unit 140 calculates the degree of difference D1A and compares the calculated degree of difference D1A with the threshold value Th1. For example, the degree of difference D1A is 765.4 and the threshold value Th1 is 900. Since the degree of difference D1A is equal to or less than the threshold value Th1, processing unit 140 determines that no abnormality has occurred in cutting.

Referring to FIG. 24, processing unit 140 calculates the difference D1B and compares the calculated difference D1B with the threshold value Th1. For example, the difference D1B is 991.9. Since the degree of difference D1B is larger than the threshold value Th1, processing unit 140 determines that an abnormality has occurred.

Processing unit 140 generates comparison information CR1 indicating a result of comparing the degree of difference D1 and the threshold value Th1, and stores the generated comparison information CR1 in storage unit 170 in association with the target period T1.

(Other Example 1 of Abnormality Determination Process)

Processing unit 140 performs an abnormality determination process further based on a result of comparing a two-dimensional shape SMD2 indicated by the measurement data MD2 including a plurality of pieces of two-dimensional data corresponding to a plurality of measurement time points in a target period T2 and the two-dimensional shape SMD1 indicated by the measurement data MD1. The target period T2 is an example of a second period. The target period T2 is a period different from the target period T1, and is, for example, a period before the target period T1. The measurement data MD2 is an example of second measurement data.

More specifically, when the measurement data MD1 in the target period T1 is stored in storage unit 170 by generation unit 120, processing unit 140 calculates a degree of difference D2 between the two-dimensional shape SMD1 indicated by the measurement data MD1 and the two-dimensional shape SMD2 indicated by the measurement data MD2 in the target period T2 in storage unit 170 using an image processing technology.

More specifically, processing unit 140 generates a binary image GMD1 based on the two-dimensional shape SMD1 and generates a binary image GMD2 based on the two-dimensional shape SMD2 in the same manner as the method of calculating the degree of difference D1. Then, processing unit 140 calculates areas of portions in which colors do not match in the binary image GMD1 and the binary image GMD2 as the degree of difference D2. Here, as the degree of difference D2 is higher, the similarity between the two-dimensional shape SMD1 and the two-dimensional shape SMD2 is lower, and as the degree of difference D2 is lower, the similarity between the two-dimensional shape SMD1 and the two-dimensional shape SMD2 is higher.

For example, processing unit 140 detects a change in the cutting condition, an abnormality related to the object to be cut, and various abnormalities such as loss and wear of insert 14 based on the degree of difference D2 between the two-dimensional shape SMD1 and the two-dimensional shape SMD2.

More specifically, processing unit 140 compares the calculated degree of difference D2 with a predetermined threshold value Th2. In a case where the degree of difference D2 is equal to or less than the threshold value Th2, processing unit 140 determines that no abnormality has occurred in the cutting. On the other hand, in a case where the degree of difference D2 is larger than the threshold value Th2, processing unit 140 determines that an abnormality has occurred.

In this way, with the configuration in which the abnormality determination process based on the degree of difference D2 is performed, it is possible to detect an abnormality based on a temporal change in the measurement data MD. Further, with the configuration in which the abnormality determination process based on the degree of difference D2 is performed in addition to the abnormality determination process based on the degree of difference D1, for example, in a case where cutting is continuously performed even after an abnormality is detected in the abnormality determination process based on the degree of difference D1 in the target period T2, it is possible to detect further occurrence of an abnormality, expansion of the abnormality, and the like.

Processing unit 140 generates comparison information CR2 indicating a comparison result between the degree of difference D2 and the threshold value Th2, and stores the generated comparison information CR2 in storage unit 170 in association with the target period T1.

(Another Example 2 of Abnormality Determination Process)

For example, processing unit 140 performs the abnormality determination process further based on a result of comparing the two-dimensional shape SMD2 indicated by the measurement data MD2 including a plurality of pieces of two-dimensional data corresponding to a plurality of measurement time points in the target period T2 and a two-dimensional shape SCD2 indicated by a calculation data CD2 calculated based on the cutting condition in the target period T2. The calculation data CD2 is an example of second calculation data.

More specifically, when pieces of the comparison information CR1 and CR2 in the target period T1 are generated, processing unit 140 obtains the comparison information CR1 in the target period T2 from storage unit 170, and performs the abnormality determination process based on pieces of the comparison information CR1 and CR2 in the target period T1 and the comparison information CR1 in the target period T2.

In addition, for example, the abnormality determination process is performed further based on a result of comparing the cutting condition in the target period T1 and the cutting condition in the target period T2.

More specifically, processing unit 140 obtains the cutting condition in the target period T1 and the cutting condition in the target period T2 from storage unit 170, and compares the obtained cutting conditions. Specifically, processing unit 140 determines whether or not the cutting condition in the target period T1 matches the cutting condition in the target period T2. Processing unit 140 generates comparison information CR3 indicating a result of comparing the cutting condition in the target period T1 and the cutting condition in the target period T2, and stores the generated comparison information CR3 in storage unit 170 in association with the target period T1.

When pieces of the comparison information CR1, CR2, and CR3 in the target period T1 are generated, processing unit 140 obtains the comparison information CR1 in the target period T2 from storage unit 170, and performs the abnormality determination process based on pieces of the comparison information CR1, CR2, and CR3 in the target period T1, and the comparison information CR1 in the target period T2.

FIG. 25 is a diagram showing an example of a result of the abnormality determination process by the processing unit in the processing apparatus according to the embodiment of the present disclosure. FIG. 25 shows the correspondence between the pattern of each comparison result indicated by pieces of the comparison information CR1, CR2, and CR3, presence or absence of abnormality, and the cause of abnormality. In FIG. 25, "Found" indicates that the item is estimated to be the cause of the abnormality.

Referring to FIG. 25, processing unit 140 determines that an abnormality has occurred when the degree of difference D1 in the target period T1 is larger than the threshold value Th1, the degree of difference D2 in the target period T1 is larger than the threshold value Th2, the degree of difference D1 in the target period T2 is equal to or less than the threshold value Th1, and the cutting condition in the target period T1 is equal to the cutting condition in the target period T2, as shown in pattern C, for example. In addition, in this case, processing unit 140 estimates that a defect of the workpiece, loss of the cutting edge, and wear of the cutting edge are causes of the abnormality. This is because the fact that the similarity between the two-dimensional shape SMD and the two-dimensional shape SCD is high in the past target period T2 while the similarity between the two-dimensional shape SMD and the two-dimensional shape SCD is low in the current target period T1 means that there is a possibility that loss or the like of the cutting edge has occurred in the period between the target period T2 and the target period T1 or a defective portion of the workpiece has been cut in the target period T1.

In addition, for example, as shown in a pattern F, when the degree of difference D1 in the target period T1 is equal to or less than the threshold value Th1, the degree of difference D2 in the target period T1 is larger than the threshold value Th2, the degree of difference D1 in the target period T2 is equal to or less than the threshold value Th1, and the cutting condition in the target period T1 does not match with the cutting condition in the target period T2, processing unit 140 determines that no abnormality has occurred. This is because the cutting conditions do not match with each other in the target periods T1 and T2, and thus it is not a problem that the degree of difference D2 is larger than the threshold value Th2. On the other hand, a high degree of similarity between the two-dimensional shape SMD and the two-dimensional shape SCD in the target periods T1 and T2 means that normal cutting is performed.

(Display Process)

Processing unit 140 performs a process of displaying the two-dimensional shape SMD indicated by the measurement data MD generated by generation unit 120. For example, processing unit 140 performs a process of further displaying the two-dimensional shape SCD indicated by the calculation data CD obtained by calculation data obtaining unit 130.

Figure 26:
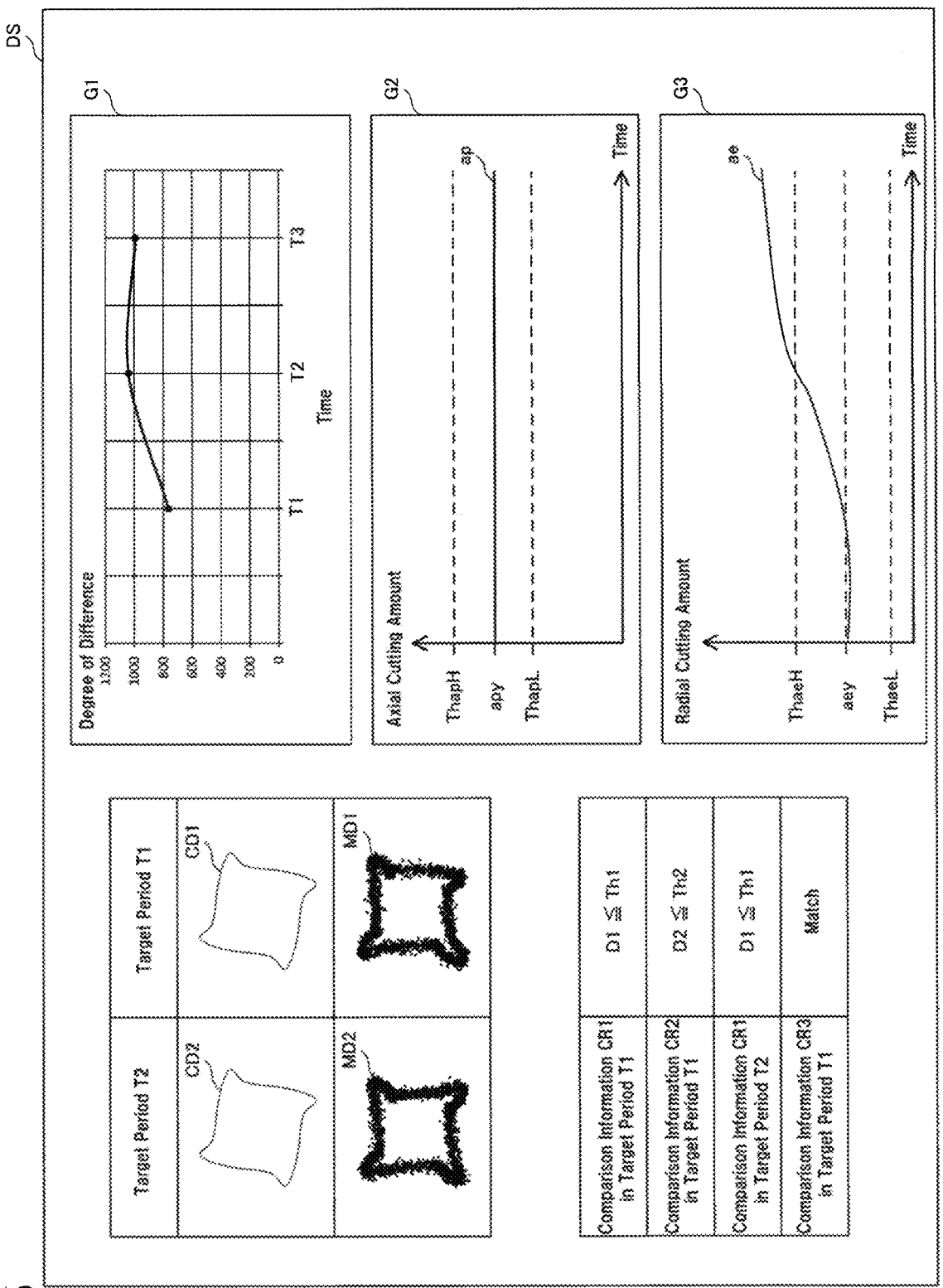
FIG. 26 is a diagram showing an example of a display screen displayed on a display unit in the processing apparatus according to the embodiment of the present disclosure.

FIG. 26 is a diagram showing an example of a display screen displayed on the display unit in the processing apparatus according to the embodiment of the present disclosure. Referring to FIG. 26, processing unit 140 performs a process of displaying a display screen DS including the calculation data CD received from calculation data obtaining unit 130 and the measurement data MD obtained from storage unit 170 on display unit 160.

More specifically, processing unit 140 performs a process of displaying the display screen DS including the calculation data CD2 in the target period T2 which is the target period T immediately after the start of the cutting, the measurement data MD2 in the target period T2, the calculation data CD1 in the target period T1 which is the latest target period T, and the measurement data MD1 in the target period T1 on display unit 160.

For example, processing unit 140 continues to display the calculation data CD2 and the measurement data MD2 until cutting ends, and updates the calculation data CD1 and the measurement data MD1 on the display screen DS with the measurement data MD and the calculation data CD of a new target period T every time generation unit 120 stores the measurement data MD of the new target period T in storage unit 170.

For example, processing unit 140 performs a process of further displaying information indicating the similarity between the two-dimensional shape SMD indicated by the measurement data MD and the two-dimensional shape SCD indicated by the calculation data CD. More specifically, processing unit 140 performs a process of displaying, on display unit 160, the display screen DS including a graph G1 indicating a temporal change in the degree of difference D1 as information indicating the degree of similarity between the two-dimensional shape SMD and the two-dimensional shape SCD. Further, for example, processing unit 140 performs a process of displaying the display screen DS including the respective comparison results indicated by pieces of the comparison information CR1, CR2, and CR3 on display unit 160.

In addition, for example, processing unit 140 performs a process of further displaying an estimation result of the cutting condition using cutting tool 101. More specifically, processing unit 140 periodically obtains condition information from storage unit 170, for example, and performs a process of displaying, on display unit 160, the display screen DS including a graph G2 indicating a temporal change in the axial direction cutting amount ap indicated by the obtained condition information and a graph G3 indicating a temporal change in the radial direction cutting amount ae indicated by the obtained condition information. Then, processing unit 140 displays the axial direction cutting amount apy indicated by the cutting condition y, which is the estimated cutting condition, on the graph G2 as the estimation result indicated by the estimation information in storage unit 170. Further, processing unit 140 displays the radial direction cutting amount aey indicated by the cutting condition y on the graph G3 as the estimation result indicated by the estimation information in storage unit 170.

Thus, the user can compare the cutting condition estimated based on the measurement data MD and the calculation data CD with the preset cutting condition. Therefore, when the set cutting condition exceeds the range of the estimated cutting condition, the user can determine that some abnormality such as cutting performed under a cutting condition different from the set cutting condition has occurred.

More specifically, processing unit 140 further displays a threshold value ThapH, which is a value obtained by adding a predetermined value to the axial direction cutting amount apy, and a threshold value ThapL, which is a value obtained by subtracting the predetermined value from the axial direction cutting amount apy, on the graph G2. In addition, processing unit 140 further displays a threshold value ThaeH, which is a value obtained by adding a predetermined value to the radial direction cutting amount aey, and a threshold value ThaeL, which is a value obtained by subtracting the predetermined value from the radial direction cutting amount aey, on the graph G3. Thus, when the axial direction cutting amount ap is larger than the threshold value ThapH or the axial direction cutting amount ap is less than the threshold value ThapL, the user can determine that some abnormality has occurred. Further, when the radial direction cutting amount ae is larger than the threshold value ThaeH or the radial direction cutting amount ae is less than the threshold value ThaeL, the user can determine that some abnormality has occurred.

[Flow of Operation]

Each device in the cutting system according to the embodiment of the present disclosure is provided with a computer including a memory, and an arithmetic processing unit such as a CPU in the computer reads a program including a part or all of each step of the following flowcharts and sequences from the memory and executes the program. The programs of these devices are distributed in a state of being stored in recording media such as an HDD (Hard Disk Drive), a CD-ROM (Compact Disc Read Only Memory), a DVD-ROM (Digital Versatile Disk Read Only Memory), and a semiconductor memory. The programs of the plurality of devices can be installed from the outside. For example, the programs of the plurality of devices can be installed from the recording medium. Further, for example, the programs of the plurality of devices can be downloaded and installed from a predetermined server or the like via a network typified by an electric communication line, a wireless communication line, a wired communication line, and the Internet. In addition, for example, the programs of the plurality of devices can be downloaded from a predetermined server or the like by data broadcasting or the like and installed.

Figure 27:
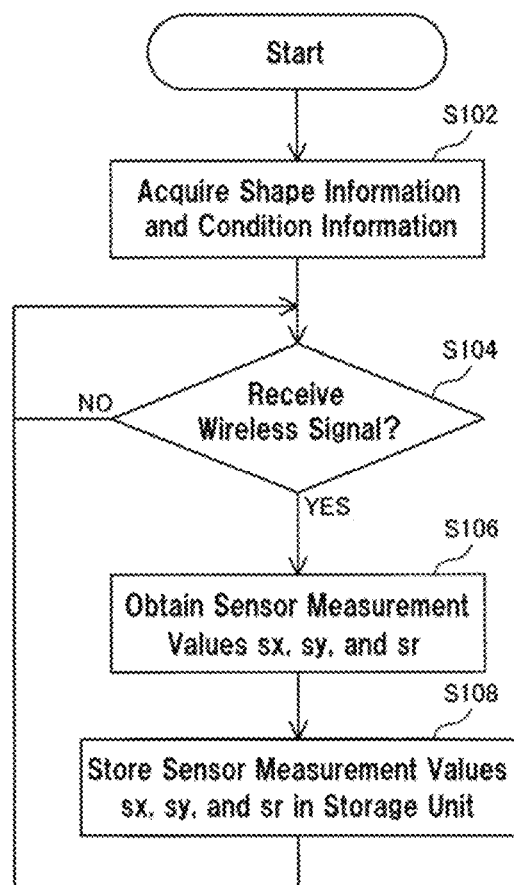
FIG. 27 is a flowchart defining an example of an operation procedure when the processing apparatus in the cutting system according to the embodiment of the present disclosure obtains various kinds of information and sensor measurement values.

FIG. 27 is a flowchart defining an example of an operation procedure when the processing apparatus in the cutting system according to the embodiment of the present disclosure obtains various kinds of information and sensor measurement values. Referring to FIG. 27, at first, processing apparatus 201 obtains shape information and condition information from the CAM before starting cutting (step S102).

Next, after the start of cutting, processing apparatus 201 waits for a wireless signal from wireless communication device 23 in cutting tool 101 (NO in step S104), and upon receiving the wireless signal (YES in step S104), obtains the sensor measurement values sx, sy, and sr and the identification information from the received wireless signal (step S106). Next, processing apparatus 201 stores the obtained sensor measurement values sx, sy, and sr and the identification information in storage unit 170 (step S108), and waits for a new wireless signal from wireless communication device 23 in cutting tool 101 (NO in step S104).

Figure 28:
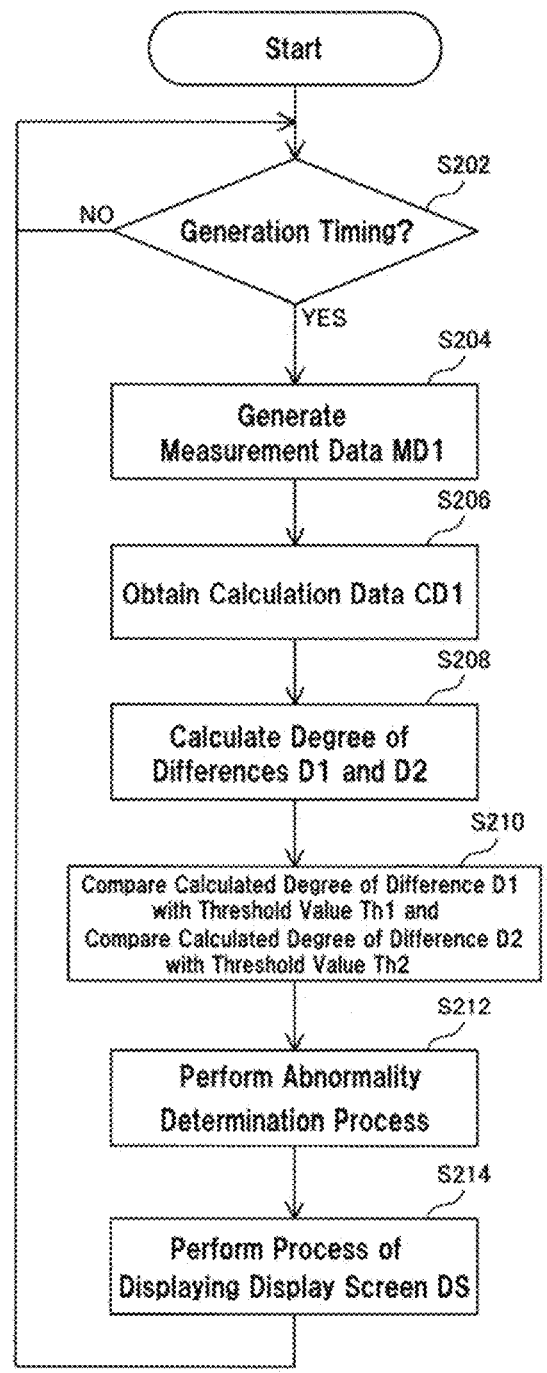
FIG. 28 is a flowchart defining an example of an operation procedure when the processing apparatus in the cutting system according to the embodiment of the present disclosure performs the abnormality determination process.

FIG. 28 is a flowchart defining an example of an operational procedure when the processing apparatus in the cutting system performs an abnormality determination process according to the embodiment of the present disclosure. Referring to FIG. 28, at first, processing apparatus 201 waits for a generation timing according to the generation cycle P (NO in step S202), and when the generation timing arrives (YES in step S202), generates measurement data MD1 composed of a plurality of pieces of two-dimensional data in the target period T1 based on a plurality of sensor measurement values sx, sy, and sr in the target period T1 (step S204).

Next, processing apparatus 201 obtains calculation data CD1 in the target period T1 (step S206).

Next, processing apparatus 201 calculates the degree of difference D1 between the two-dimensional shape SMD1 indicated by the measurement data MD1 in the target period T1 and the two-dimensional shape SCD1 indicated by the calculation data CD1 in the target period T1. In addition, processing apparatus 201 calculates the degree of difference D2 between the two-dimensional shape SMD1 indicated by the measurement data MD1 in the target period T1 and the two-dimensional shape SMD2 indicated by the measurement data MD2 in the past target period T2 (step S208).

Next, processing apparatus 201 compares the calculated degree of difference D1 with the threshold value Th1. Further, processing apparatus 201 compares the calculated degree of difference D2 with the threshold value Th2 (step S210).

Next, processing apparatus 201 performs an abnormality determination process based on the result of comparing the degree of difference D1 in the target period T1 and the threshold value Th1, the result of comparing the degree of difference D2 in the target period T1 and the threshold value Th2, the result of comparing the degree of difference D1 in the past target period T2 and the threshold value Th1, and the result of comparing the cutting condition in the target period T1 and the cutting condition in the target period T2 (step S212).

Next, processing apparatus 201 performs a process of displaying, on display unit 160, the display screen DS including the two-dimensional shape SCD2 indicated by the calculation data CD2 in the target period T2 and the two-dimensional shape SMD2 indicated by the measurement data MD2, the two-dimensional shape SCD1 indicated by the calculation data CD1 in the target period T1 and the two-dimensional shape SMD1 indicated by the measurement data MD1, and the graph G1 indicating a temporal change in the degree of difference D1 (step S214).

Next, processing apparatus 201 waits for a new generation timing (NO in step S202).

Figure 29:
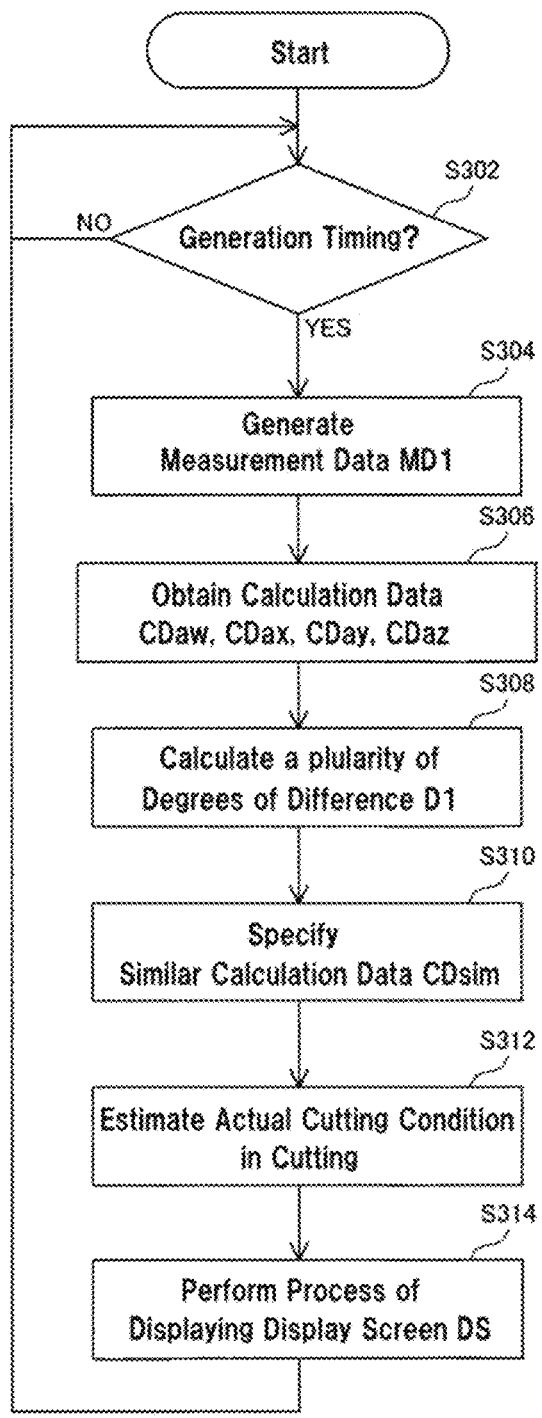
FIG. 29 is a flowchart defining an example of an operation procedure when the processing apparatus in the cutting system according to the embodiment of the present disclosure performs a condition estimation process.

FIG. 29 is a flowchart defining an example of an operation procedure when the processing apparatus in the cutting system according to the embodiment of the present disclosure performs a condition estimation process. Referring to FIG. 29, at first, processing apparatus 201 waits for a generation timing according to the generation cycle P (NO in step S302), and when the generation timing arrives (YES in step S302), generates measurement data MD1 composed of a plurality of pieces of two-dimensional data in the target period T1 based on a plurality of sensor measurement values sx, sy, and sr in the target period T1 (step S304).

Next, processing apparatus 201 obtains the calculation data CDaw, CDax, CDay, and CDaz as the calculation data CD1 in the target period T1 (step S306).

Next, processing apparatus 201 calculates the degree of difference D1 between the two-dimensional shape SMD1 indicated by the measurement data MD1 in the target period T1 and the two-dimensional shape SCD indicated by the calculation data CDaw, CDax, CDay, and CDaz respectively (step S308).

Next, processing apparatus 201 specifies, for example, the calculation data CDay as the similar calculation data CDsim among a plurality of the calculated degrees of difference D1 (step S310).

Next, processing apparatus 201 estimates the actual cutting condition in cutting based on the cutting condition y corresponding to the calculation data CDay which is the similar calculation data CDsim (Step S312).

Next, processing apparatus 201 performs a process of displaying the display screen DS including the graph G2 indicating the axial cutting amount apy indicated by the cutting condition y which is the estimated cutting condition and the graph G3 indicating the radial cutting amount aey indicated by the cutting condition y on display unit 160 (step S314).

Next, processing apparatus 201 waits for a new generation timing (NO in step S302).

Figure 30:
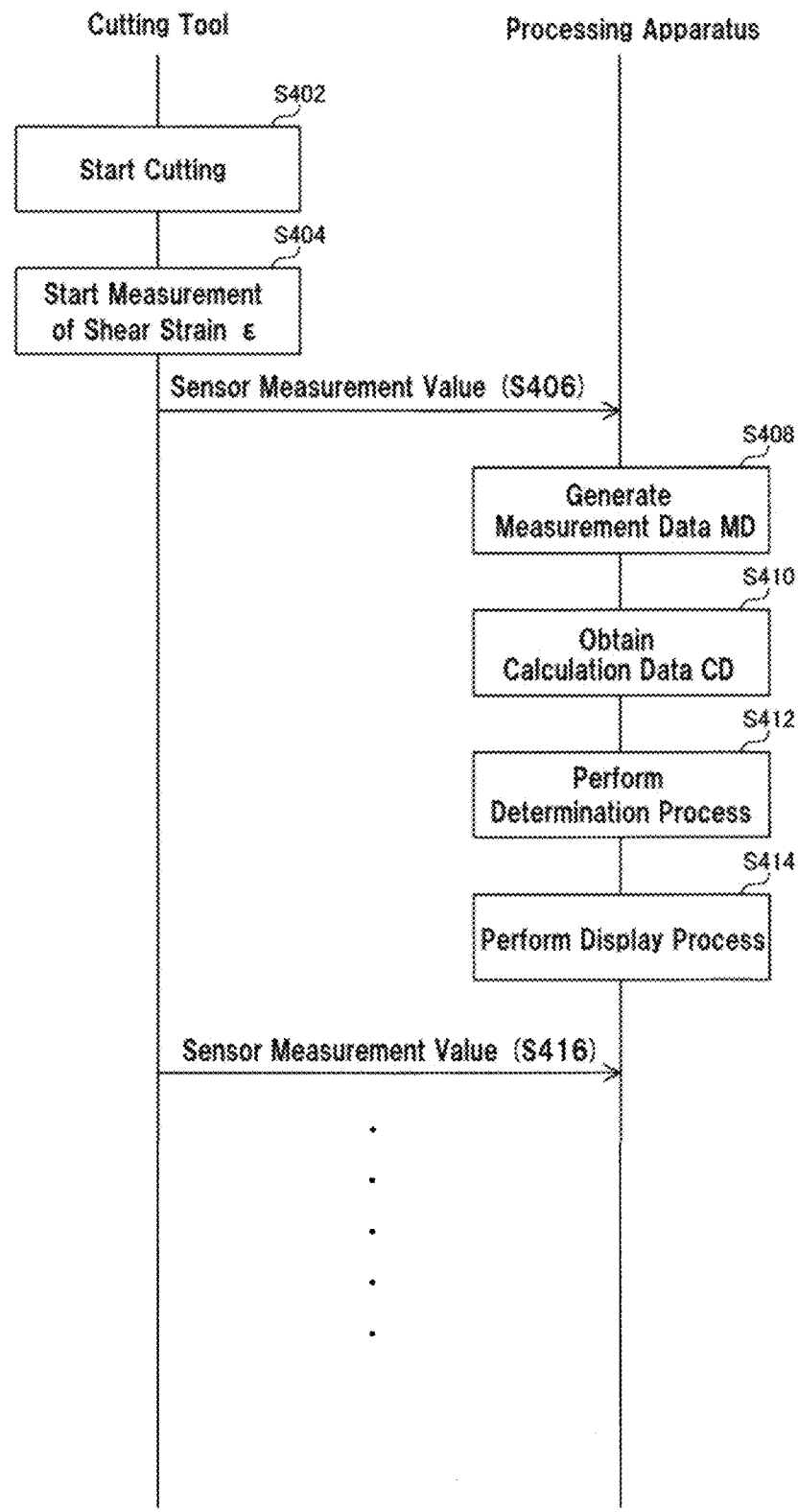
FIG. 30 is a diagram showing an example of a sequence of a determination process and a display process in the cutting system according to the embodiment of the present disclosure.

FIG. 30 is a diagram showing an example of a sequence of a determination process and a display process in the cutting system according to the embodiment of the present disclosure. Referring to FIG. 30, at first, cutting tool 101 starts cutting (step S402). Next, strain sensor 20 provided in cutting tool 101 starts measurement of the shear strain of shaft part 10 (step S404). Next, cutting tool 101 includes the sensor measurement values sx, sy, and sr based on the analog signal from strain sensor 20 in a wireless signal and transmits the wireless signal to processing apparatus 201 (Step S406).

Next, processing apparatus 201 obtains the sensor measurement values sx, sy, sr from the wireless signal received from cutting tool 101, and generates the measurement data MD in the target period T based on the obtained sensor measurement values sx, sy, sr and the conversion matrix in storage unit 170 (step S408). Next, processing apparatus 201 obtains calculation data CD in the target period T (step S410). Next, processing apparatus 201 performs a determination process based on the two-dimensional shape SMD indicated by the measurement data MD and the two-dimensional shape SCD indicated by the calculation data CD (step S412). Next, processing apparatus 201 performs display process (Step S414).

Next, cutting tool 101 transmits new sensor measurement values sx, sy, and sr based on the analog signal from strain sensor 20, included in a wireless signal, to processing apparatus 201 (step S416).

By the way, there is a demand for a technique capable of realizing excellent functions relating to the state of cutting using a cutting tool.

For example, PTL 1 describes that an abnormality of a cutting blade is detected based on a result of comparing a two-dimensional shape indicated by two-dimensional data generated in advance based on measurement results from sensors and a two-dimensional shape indicated by two-dimensional data generated based on measurement results from sensors during cutting. However, using the technique described in PTL 1, it is necessary to generate in advance the two-dimensional data corresponding to all cutting tools 101 to be used, and the technique described in PTL 1 is not practical.

In addition, using the technique described in PTL 2, a two-dimensional projection view obtained from measurement results from sensors becomes asymmetric due to an influence of a positional deviation in a rotation axis direction of each cutting edge and a radial direction of a shaft, and abnormality or the like of the cutting edge may not be accurately detected.

On the other hand, in processing system 301 according to the embodiment of the present disclosure, as described above, with the configuration in which the determination process is performed based on the two-dimensional shape indicated by the measurement data including a plurality of pieces of two-dimensional data generated based on the measurement results from the plurality of sensors and the two-dimensional shape indicated by the calculation data including a plurality of pieces of two-dimensional data calculated based on the shape of the cutting tool, for example, it is possible to perform a determination regarding cutting based on the degree of similarity between the two-dimensional shape of the two-dimensional data to be generated when normal and ideal cutting is performed and the two-dimensional shape of the actually generated two-dimensional data. Therefore, it is possible to realize an excellent function regarding the state of cutting using the cutting tool.

Modification

In processing apparatus 201 according to the embodiment of the present disclosure, processing unit 140 is configured to calculate the sum XORsum of exclusive ORs XOR for each corresponding pixel in the binary image GMD based on the measurement data MD and the binary image GCD based on the calculation data CD as the degree of difference D1 between the two-dimensional shape SCD and the two-dimensional shape SMD, but is not limited thereto. Processing unit 140 may be configured to calculate the degree of difference or the degree of similarity between the two-dimensional shape SCD and the two-dimensional shape SMD, instead of the total value XORsum or in addition to the total value XORsum, using an image processing technique such as Average Hash, Perceptual Hash, histogram comparison, feature point matching, template matching, or class classification.

In processing system 301 according to the embodiment of the present disclosure, strain sensor 20 is configured to measure the shear strain ε of shaft part 10, but is not limited thereto. Strain sensor 20 may be configured to measure the strain ε of shaft part 10 in a direction parallel to rotation axis 17. In this case, for example, generation unit 120 generates the measurement data MD including the two-dimensional data indicating a moment Mx generated by a load in the X direction and a moment My generated by a load in the Y direction in cutting force exertion plane 18 based on the sensor measurement value indicating the vertical strain measured by strain sensor 20.

In addition to strain sensor 20 that measures the shear strain ε, processing system 301 may be configured to include one or more strain sensors 20 that measure the vertical strain. Processing system 301 may be configured to include other sensors such as an acceleration sensor, a speed sensor, and a displacement sensor instead of strain sensor 20 or in addition to strain sensor 20 as the plurality of sensors. In this case, generation unit 120 generates measurement data MD including two-dimensional data indicating acceleration in the X-direction and acceleration in the Y-direction of cutting tool 101 in cutting force exertion plane 18, measurement data MD including two-dimensional data indicating velocity in the X-direction and velocity in the Y-direction of cutting tool 101 in cutting force exertion plane 18, or measurement data MD including two-dimensional data indicating displacement in the X-direction and displacement in the Y-direction of cutting tool 101 in cutting force exertion plane 18 based on the measurement result by the sensor.

Further, in processing apparatus 201 according to the embodiment of the present disclosure, calculation data obtaining unit 130 is configured to obtain the calculation data CD indicating the cutting area vector Vd calculated in advance, but is not limited thereto. Calculation data obtaining unit 130 may be configured to obtain calculation data CD indicating a load Fx and a load Fy calculated in advance based on information such as a feed rate per tooth of insert 14, a workpiece, and a rake angle of cutting tool 101. However, the calculation data CD indicating the cutting area vector Vd can be generated by simpler calculation processing using less information on the shape of cutting tool 101 than the calculation data CD indicating the load Fx and the load Fy. Further, as described above, processing unit 140 can calculate the degree of difference D1 as an indicator indicating the difference between the geometric shape of the calculation data CD indicating the cutting-area vector Vd and the geometric shape of the measurement data MD. Therefore, with the configuration in which processing apparatus 201 obtains the calculation data CD indicating the cutting area vector Vd and performs the determination process based on the two-dimensional shape SCD indicated by the calculation data CD and the two-dimensional shape SMD indicated by the measurement data MD, it is possible to provide a system that performs the determination process with a simple configuration.

In processing apparatus 201 according to the embodiment of the present disclosure, processing unit 140 is configured to perform the abnormality determination process and the condition determination process, but is not limited thereto. Processing unit 140 may be configured not to perform any one of the abnormality determination process and the condition determination process.

In processing apparatus 201 according to the embodiment of the present disclosure, processing unit 140 is configured to perform the determination process based on the two-dimensional shape SCD indicated by the different calculation data CD for each cutting condition, but is not limited thereto. Processing unit 140 may be configured to perform the determination process based on the two-dimensional shape SCD indicated by the calculation data CD common to the plurality of cutting conditions.

Further, in processing apparatus 201 according to the embodiment of the present disclosure, processing unit 140 is configured to perform the abnormality determination process based on pieces of the comparison information CR1, CR2, and CR3 in the target period T1 and the comparison information CR1 in the target period T2, but is not limited thereto. Processing unit 140 may be configured to perform the abnormality determination process without using at least one of pieces of the comparison information CR2 and CR3 in the target period T1 and the comparison information CR1 in the target period T2.

In processing apparatus 201 according to the embodiment of the present disclosure, generation unit 120 is configured to generate the measurement data MD including two-dimensional data corresponding to a plurality of measurement time points in a period required for cutting tool 101 to rotate a plurality of times, but is not limited thereto. Generation unit 120 may be configured to generate the measurement data MD including two-dimensional data corresponding to a plurality of measurement time points in a period required for cutting tool 101 to make one rotation.

In processing apparatus 201 according to the embodiment of the present disclosure, generation unit 120 is configured to generate the measurement data MD in which the rotation angle of two pieces of two-dimensional data adjacent to each other around rotation axis 17 is 5° or less, but is not limited thereto. Generation unit 120 may be configured to generate measurement data MD in which a rotation angle of two two-dimensional data adjacent to each other around rotation axis 17 is larger than 5°.

In processing apparatus 201 according to the embodiment of the present disclosure, calculation data obtaining unit 130 is configured to obtain the calculation data CD in which the rotation angle of two pieces of two-dimensional data adjacent to each other around rotation axis 17 is 2° or less, but is not limited thereto. Calculation data obtaining unit 130 may be configured to obtain calculation data CD in which a rotation angle of two pieces of two-dimensional data adjacent to each other around rotation axis 17 is larger than 2°.

In processing apparatus 201 according to the embodiment of the present disclosure, processing unit 140 is configured to perform a process of displaying the display screen DS including the graphs G1, G2, and G3 on display unit 160, but is not limited thereto. Processing unit 140 may be configured to perform a process of displaying the display screen DS that does not include at least one of the graphs G1, G2, and G3 on display unit 160.

In processing apparatus 201 according to the embodiment of the present disclosure, shape information obtaining unit 151 is configured to obtain shape information from the CAM, but is not limited thereto. For example, shape information obtaining unit 151 may be configured to receive shape information from the user. Further, for example, shape information obtaining unit 151 may be configured to receive the model number of cutting tool 101 from the user and acquire the shape information corresponding to the received model number from storage unit 170.

In processing apparatus 201 according to the embodiment of the present disclosure, condition information obtaining unit 152 is configured to obtain condition information from the CAM, but is not limited thereto. For example, condition information obtaining unit 152 may be configured to receive condition information from the user.

In addition, processing system 301 according to the embodiment of the present disclosure is configured to include processing apparatus 201 separately from cutting tool 101, but is not limited thereto. Processing apparatus 201 may be provided in cutting tool 101, or may be provided in a machine tool. Processing apparatus 201 is configured to perform the determination process and the display process, but is not limited thereto. Processing apparatus 201 may be configured not to perform any one of the determination process and the display process.

In processing apparatus 201 according to the embodiment of the present disclosure, processing unit 140 is configured to perform a process of displaying the two-dimensional shape SMD indicated by the measurement data MD and the two-dimensional shape SCD indicated by the calculation data CD, but is not limited thereto. Processing unit 140 may be configured to perform the process of displaying the two-dimensional shape SMD and not perform the process of displaying the two-dimensional shape SCD.

Further, in processing apparatus 201 according to the embodiment of the present disclosure, processing unit 140 is configured to perform the determination process based on the two-dimensional shape SMD indicated by the measurement data MD and the two-dimensional shape SCD indicated by the calculation data CD, but is not limited thereto. Processing unit 140 may be configured to perform the determination process based on the two-dimensional shape SMD indicated by the measurement data MD without using the calculation data CD. In this case, processing apparatus 201 may not include at least one of calculation data obtaining unit 130, shape information obtaining unit 151, and condition information obtaining unit 152.

For example, processing unit 140 may perform the determination process based on a degree of rotational symmetry of the two-dimensional shape SMD. More specifically, processing unit 140 generates n comparison images GMDC by rotating the white region in the binary image GMD generated based on the measurement data MD by a rotation angle Δθ° around the center of the binary image GMD. Then, processing unit 140 calculates a degree of difference D3 between the binary image GMD and the comparison image GMDC as the degree of rotational symmetry indicating the degree of rotational symmetry of the two-dimensional shape SMD, and performs the determination process based on the calculated degree of difference D3. Here, n is an integer equal to or larger than 1. Δθ° is preferably 2° or less, and more preferably 1° or less.

Figure 31:
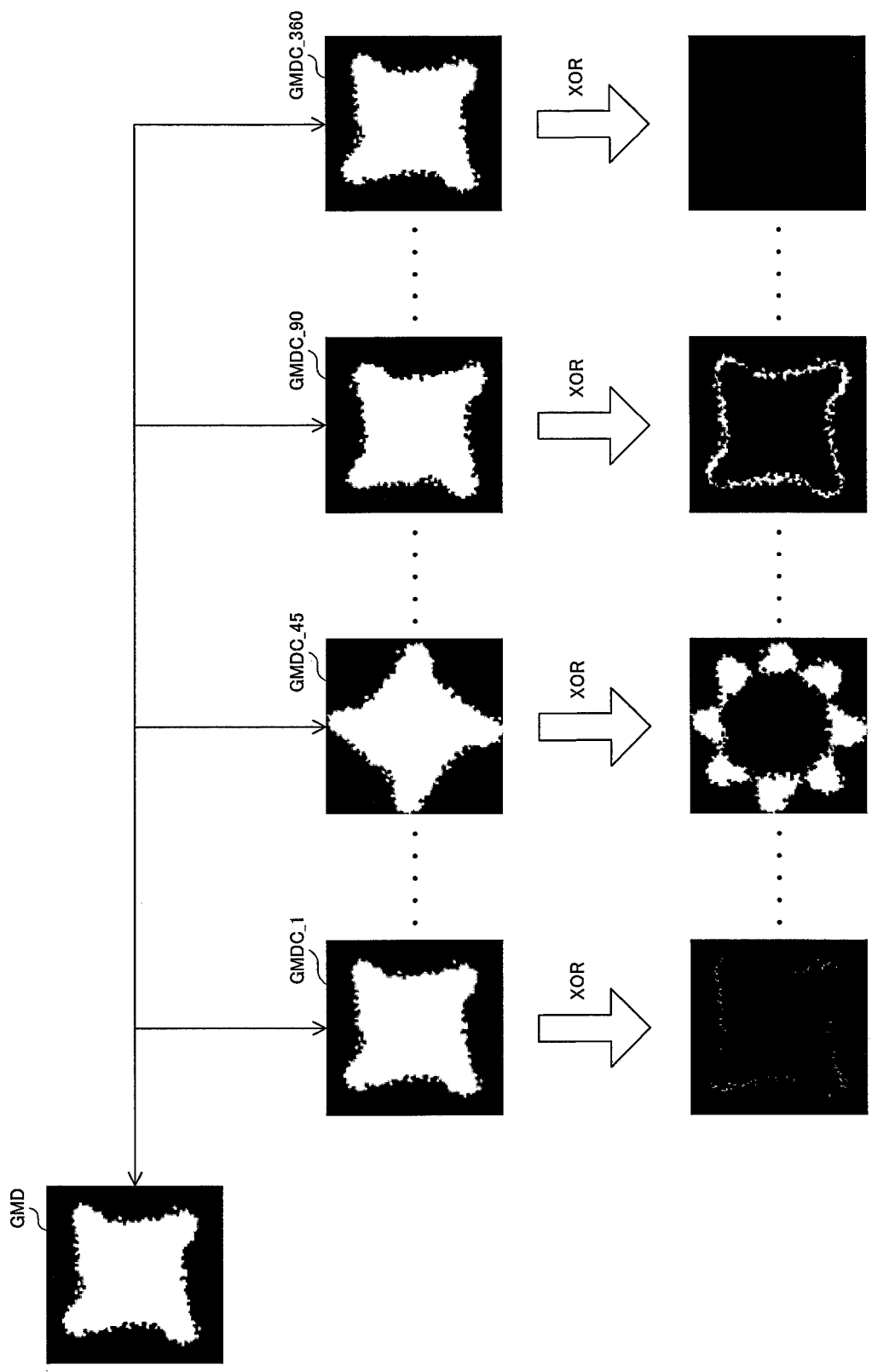
FIG. 31 is a diagram showing an example of a method for calculating a degree of rotational symmetry of a two-dimensional shape by the processing unit in the processing apparatus according to a modification of the embodiment of the present disclosure.

FIG. 31 is a diagram showing an example of a method for calculating a degree of rotational symmetry of a two-dimensional shape by the processing unit in the processing apparatus according to the modification of the embodiment of the present disclosure. FIG. 31 shows a comparative image GMDC_1 in which the rotation angle θ of the white region in the binary image GMD is 1°, a comparative image GMDC_45 in which the rotation angle θ of the white region in the binary image GMD is 45°, a comparative image GMDC_90 in which the rotation angle θ of the white region in the binary image GMD is 90°, and a comparative image GMDC_360 in which the rotation angle θ of the white region in the binary image GMD is 360°. Referring to FIG. 31, for example, processing unit 140 rotates the white area in the binary image GMD by 1° around the center of the binary image GMD to generate 360 comparison images GMDC. Then, processing unit 140 calculates areas of portions in which colors do not match in the binary image GMD and the comparison image GMDC as the degree of difference D3 between the binary image GMD and the comparison image GMDC in the same manner as the method of calculating the degree of difference D1.

Figure 32:
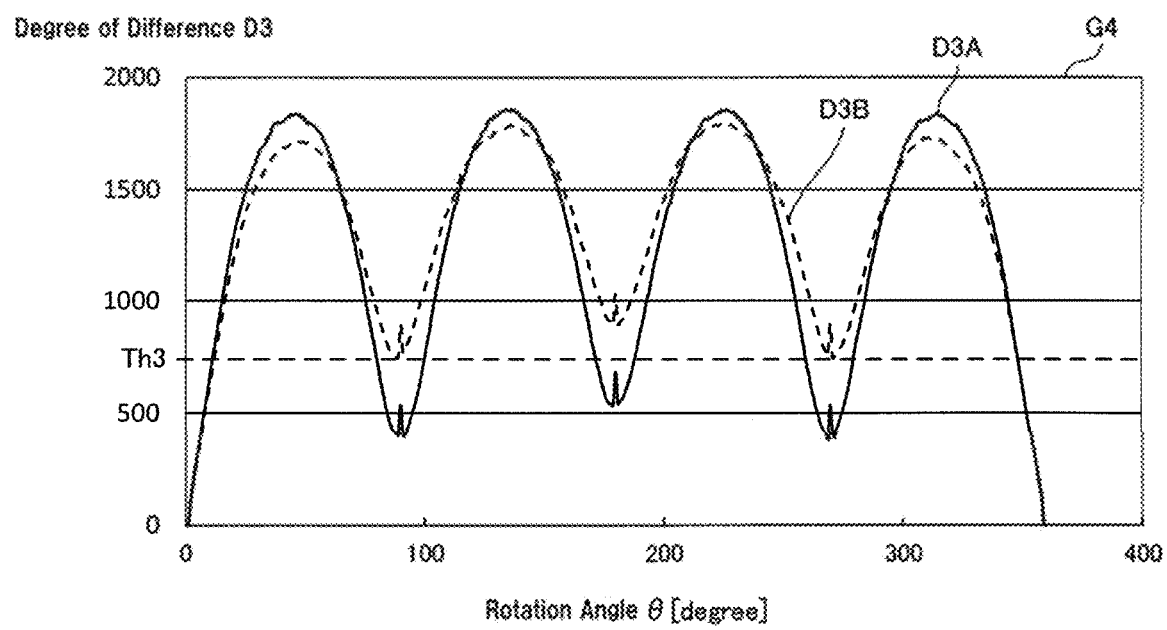
FIG. 32 is a diagram showing a relationship between a degree of difference calculated by the processing unit in the processing apparatus according to the modification of the embodiment of the present disclosure and a rotation angle.

FIG. 32 is a diagram showing a relationship between a degree of difference and a rotation angle calculated by the processing unit in the processing apparatus according to the modification of the embodiment of the present disclosure. FIG. 32 shows a graph G4 in which the horizontal axis represents the rotation angle θ [degree] and the vertical axis represents the degree of difference D3. In FIG. 32, the solid line indicates a degree of difference D3A which is the degree of difference D3 in a state where no loss of insert 14 has occurred, and the broken line indicates a degree of difference D3B which is the degree of difference D3 in a state where loss of insert 14 has occurred. Referring to FIG. 32, the degree of difference D3 has four minimum values corresponding to "4" which is the number of cutting edges of cutting tool 101. Specifically, the degree of difference D3 has a minimum value when the rotation angle θ is 90°, 180°, 270°, and 360° respectively. This is because the two-dimensional shape SMD is theoretically X-fold symmetric when the number of blades of cutting tool 101 is X.

Processing unit 140 performs a determination process based on the minimum value of the degree of difference D3. Here, as the minimum value of the degree of difference D3 is larger, the degree of rotational symmetry of the two-dimensional shape SMD is lower, and as the minimum value of the degree of difference D3 is smaller, the degree of rotational symmetry of the two-dimensional shape SMD is higher. For example, the degree of rotational symmetry of the two-dimensional shape SMD decreases due to occurrence of an abnormality such as loss of insert 14.

For example, processing unit 140 compares the three minimum values other than the minimum value when the rotation angle θ is 360° in the degree of difference D3 with a predetermined threshold value Th3, and detects various abnormalities based on the comparison result. More specifically, processing unit 140 determines that an abnormality has occurred in cutting when at least one of the three minimum values is larger than the threshold value Th3, and determines that no abnormality has occurred in cutting when the three minimum values are equal to or less than the threshold value Th3.

Specifically, processing unit 140 compares the three minimum values excluding the minimum value when the rotation angle θ is 360° in the degree of difference D3A with the threshold value Th3, and determines that no abnormality has occurred in cutting because the three minimum values are equal to or less than the threshold value Th3. Further, processing unit 140 compares the three minimum values excluding the minimum value when the rotation angle θ is 360° in the degree of difference D3B with the threshold value Th3, and determines that an abnormality has occurred in cutting because the minimum value when the rotation angle θ is 180° among the three minimum values is larger than the threshold value Th3.

Processing unit 140 may be configured to detect various abnormalities based on a temporal change in the three minimum values other than the minimum value when the rotation angle θ is 360° in the degree of difference D3. More specifically, processing unit 140 calculates a difference D1 between a minimum value of a degree of difference D3C calculated based on the measurement data MD1 of a certain target period T1C and a minimum value of a degree of difference D3D calculated based on the measurement data MD1 in a target period T1D different from the target period T1C, and detects various abnormalities based on a result of comparing the calculated difference D1 and a predetermined threshold value Th4.

In addition, processing unit 140 may be configured to calculate a difference D2 between the maximum value of the three minimum values excluding the minimum value when the rotation angle θ is 360° in the degree of difference D3 and the minimum value of the three minimum values, and detect various abnormalities based on a comparison result between the calculated difference D2 with a predetermined threshold value Th5.

Figure 33:
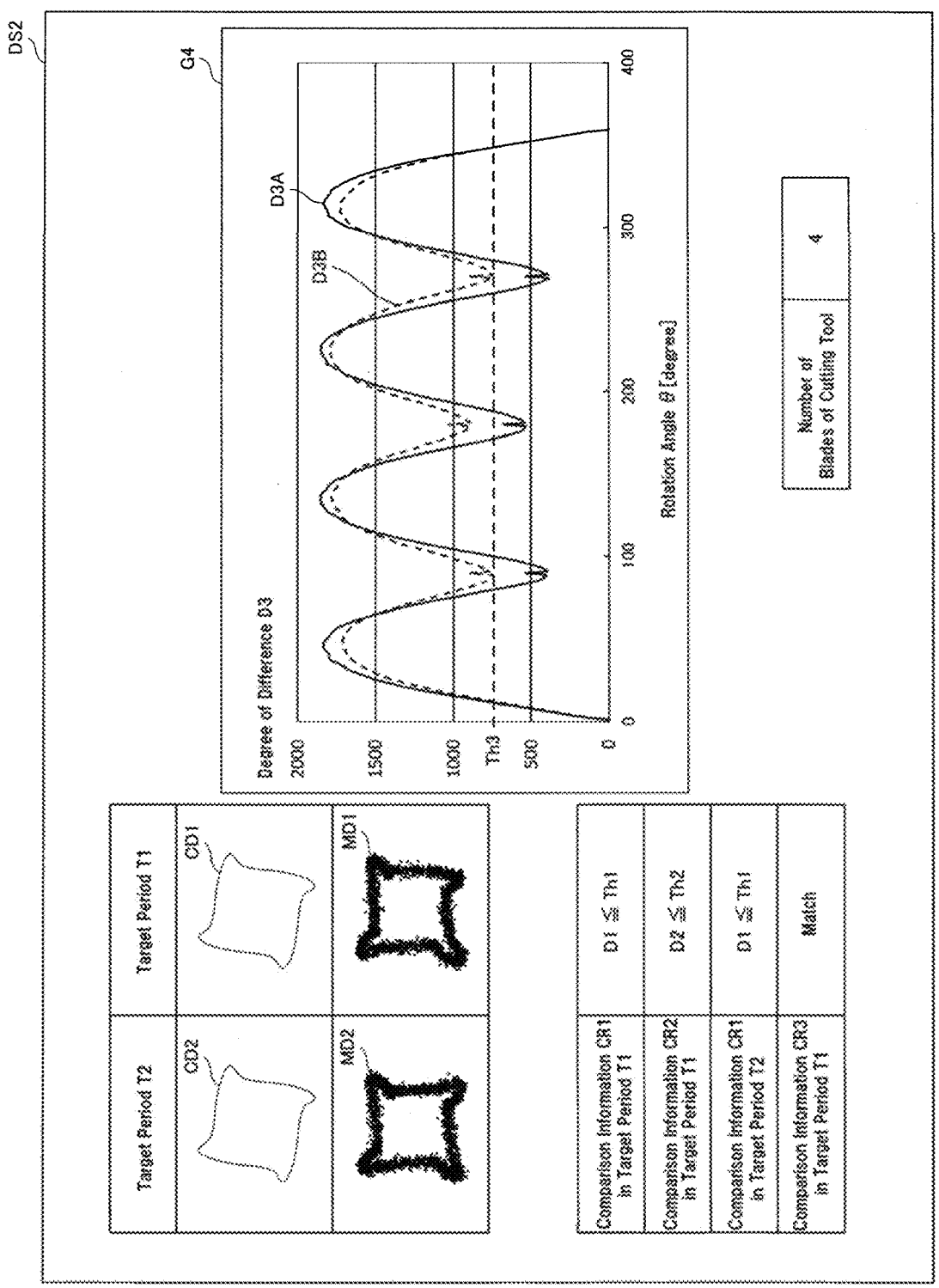
FIG. 33 is a diagram showing an example of a display screen displayed on the display unit in the processing apparatus according to the modification of the embodiment of the present disclosure.

FIG. 33 is a diagram showing an example of a display screen displayed on the display unit in the processing apparatus according to the modification of the embodiment of the present disclosure. Referring to FIG. 33, processing unit 140 performs a process of displaying a display screen DS2 including the graph G4 indicating the relationship between the calculated degree of difference D3 and the rotation angle θ on display unit 160. For example, processing unit 140 performs a process of estimating the number of blades of cutting tool 101 based on the number of the minimum values of the degree of difference D3, and displaying the display screen DS further including the estimation result of the number of blades on display unit 160.

Figure 34:
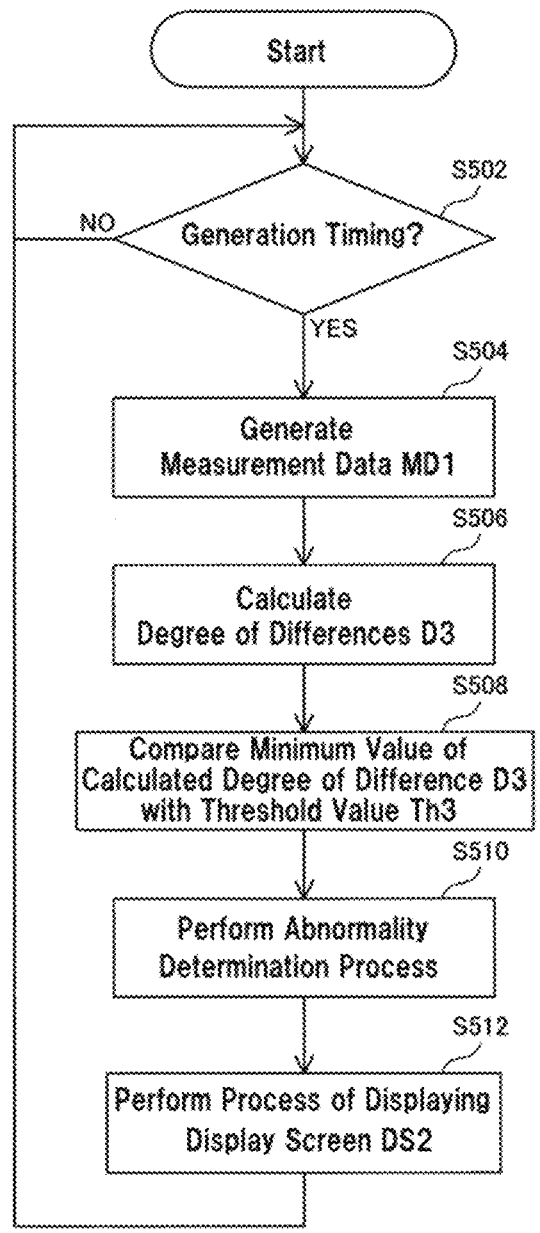
FIG. 34 is a flowchart defining an example of an operation procedure when the processing apparatus in the cutting system according to the modification of the embodiment of the present disclosure performs an abnormality determination process.

FIG. 34 is a flowchart defining an example of an operation procedure when the processing apparatus in the cutting system according to the modification of the embodiment of the present disclosure performs an abnormality determination process. Referring to FIG. 34, first, processing apparatus 201 waits for a generation timing according to the generation cycle P (NO in step S502), and when the generation timing arrives (YES in step S502), generates measurement data MD1 composed of a plurality of pieces of two-dimensional data in the target period T1 based on a plurality of sensor measurement values sx, sy, and sr in the target period T1 (step S504).

Next, processing apparatus 201 calculates the degree of difference D3 based on the measurement data MD1 (step S506).

Next, processing apparatus 201 compares the three minimum values other than the minimum value when the rotation angle θ is 360° in the degree of difference D3 with the threshold value Th3 (step S508).

Next, processing apparatus 201 performs the abnormality determination process based on a result of comparing the three minimum values and the threshold value Th3 (step S510).

Processing apparatus 201 performs a process of displaying the display screen DS2 including the two-dimensional shape SMD1 indicated by the measurement data MD1 in the target period T1, the estimation result of the number of blades, and the graph G4 indicating the relationship between the degree of difference D3 and the rotation angle θ on display unit 160 (step S512).

Next, processing apparatus 201 waits for a new generation timing (NO in step S502).

The above-described embodiments are to be considered in all respects as illustrative and not restrictive. The scope of the present invention is defined not by the above description but by the claims, and is intended to include meanings equivalent to the claims and all modifications within the scope.

The foregoing description includes the following additional features.

Additional Note 1

A processing system comprising:
a cutting tool for milling;
a plurality of sensors; and
a processing unit,
the plurality of sensors each being configured to measure a physical quantity that indicates a state related to loads on the cutting tool during cutting,
the processing unit being configured to generate, based on measurement results from the respective sensors at a plurality of measurement time points, measurement data that is related to the loads in two directions on a plane perpendicular to a rotation axis of the cutting tool and that includes two-dimensional data at each of the measurement time points, to obtain calculation data that is calculated based on a shape of the cutting tool and that includes a plurality of pieces of two-dimensional data, at a plurality of time points, related to the loads in the two directions on the plane perpendicular to the rotation axis, and to perform a determination process concerning cutting in which the cutting tool is used, based on a two-dimensional shape indicated by the generated measurement data and a two-dimensional shape indicated by the obtained calculation data, and the processing unit being configured to obtain the calculation data that includes a plurality of pieces of two-dimensional data that indicates a cutting area vector on a plane perpendicular to the rotation axis.

REFERENCE SIGNS LIST 10 shaft part
11 shank part
12 blade fitting part
13 blade fixing part
14 insert
17 rotation axis
18 cutting force exertion plane
20 strain sensor
22 battery
23 wireless communication device
24 housing
101 cutting tool
110 wireless communication unit
120 generation unit
130 calculation data obtaining unit
140 processing unit
151 shape information obtaining unit
152 condition information obtaining unit
160 display unit
170 storage unit
201 processing apparatus
210 tool holder
220 main shaft
301 processing system

The invention claimed is:

1. A processing system comprising:
a cutting tool for cutting;
a plurality of sensors disposed on the cutting tool; and
a processor that obtains measurement results measured by the plurality of sensors and process the obtained measurement results, wherein
the plurality of sensors each being configured to measure a physical quantity that indicates a state related to loads on the cutting tool during cutting,
the processor being configured to generate, based on the obtained measurement results from the respective sensors at a plurality of measurement time points, measurement data that is related to the loads in two directions on a plane perpendicular to a rotation axis of the cutting tool and that includes two-dimensional data at each of the measurement time points, and to perform a determination process concerning cutting in which the cutting tool is used, based on a two-dimensional shape indicated by the generated measurement data,
the processor is configured to obtain calculation data that is calculated based on a shape of the cutting tool and based on a cutting condition when the cutting tool is used and that includes a plurality of pieces of two-dimensional data, at a plurality of time points, related to the loads in the two directions on the plane perpendicular to the rotation axis, and
the determination process, further includes determining an abnormality in cutting in which the cutting tool is used, based on a result of comparing the two-dimensional shape indicated by the measurement data that includes the plurality of pieces of two-dimensional data corresponding to the plurality of measurement time points in a first period with a two-dimensional shape indicated by the calculation data that is calculated based on the cutting condition in the first period.

2. The processing system according to claim 1, wherein the processor is configured to perform the determination process, based on the two-dimensional shape indicated by the calculation data that differs depending on the cutting condition.

3. The processing system according to claim 1, wherein the processor is configured to perform the determination process, further based on a result of comparing a two-dimensional shape indicated by second measurement data that includes a plurality of pieces of two-dimensional data corresponding to the plurality of measurement time points in a second period different from the first period with the two-dimensional shape indicated by the first measurement data.

4. The processing system according to claim 1, wherein the processor is configured to perform the determination process, further based on a result of comparing a two-dimensional shape indicated by second measurement data that includes a plurality of pieces of two-dimensional data corresponding to the plurality of measurement time points in a second period different from the first period with a two-dimensional shape indicated by second calculation data that is calculated based on the cutting condition in the second period.

5. The processing system according to claim 1, wherein the processor is configured to perform the determination process, further based on a result of comparing the cutting condition in the first period with the cutting condition in a second period different from the first period.

6. The processing system according to claim 1, wherein the processor is configured to perform the determination process, based on a degree of similarity between the two-dimensional shape indicated by the measurement data and the two-dimensional shape indicated by the calculation data.

7. The processing system according to claim 1, wherein the processor is configured to perform the determination process concerning a cutting condition of cutting in which the cutting tool is used.

8. The processing system according to claim 1, wherein the processor is configured to generate the measurement data that includes a plurality of pieces of two-dimensional data corresponding to the plurality of measurement time points in a period of time taken for the cutting tool to rotate a plurality of times.

9. The processing system according to claim 1, wherein the processor is configured to generate the measurement data in which a rotation angle between two pieces of two-dimensional data adjacent to each other around the rotation axis is 5° or less and to obtain the calculation data in which a rotation angle between two pieces of two-dimensional data adjacent to each other around the rotation axis is 5° or less.

10. A processing system comprising: a cutting tool for cutting;
a plurality of sensors disposed on the cutting tool; and
a processor that obtains measurement results measured by the plurality of sensors and processes the obtained measurement results, wherein
the plurality of sensors each being configured to measure a physical quantity that indicates a state related to loads on the cutting tool during cutting,
the processor being configured to generate, based on the obtained measurement results from the respective sensors at a plurality of measurement time points, measurement data that is related to the loads in two directions on a plane perpendicular to a rotation axis of the cutting tool and that includes two-dimensional data at each of the measurement time points, and to perform a determination process concerning cutting in which the cutting tool is used, based on a two-dimensional shape indicated by the generated measurement data, the processor is configured to obtain calculation data that is calculated based on a shape of the cutting tool and based on a cutting condition when the cutting tool is used and that includes a plurality of pieces of two-dimensional data, at a plurality of time points, related to the loads in the two directions on the plane perpendicular to the rotation axis, the determination process, further includes determining an abnormality in cutting in which the cutting tool is used, based on a result of comparing the two-dimensional shape indicated by the measurement data that includes the plurality of pieces of two-dimensional data corresponding to the plurality of measurement time points in a first period with a two-dimensional shape indicated by the calculation data that is calculated based on the cutting condition in the first period, and the processor is configured to calculate a degree of rotational symmetry indicating a degree of the rotational symmetry based on a result of comparison between a two-dimensional shape indicated by the obtained calculation data and a shape obtained by rotating the two-dimensional shape indicated by the obtained calculation data around a center, and perform the determination process based on the calculated degree of rotational symmetry.

11. A processing apparatus comprising:

a processor configured to obtain measurement results from a plurality of sensors disposed on a cutting tool, the measurement results being physical quantities each indicating a state related to loads on the cutting tool during cutting, generate, based on the measurement results from the respective sensors at a plurality of measurement time points previously obtained measurement data that is related to the loads in two directions on a plane perpendicular to a rotation axis of the cutting tool and that includes two-dimensional data at each of the measurement time points, perform a determination process concerning cutting in which the cutting tool is used, based on a two-dimensional shape indicated by the measurement data previously generated, acquire calculation data including a plurality of two-dimensional data regarding the load in two directions on a plane perpendicular to the rotation axis at a plurality of time points, the calculation data being calculated based on a shape of the cutting tool, and based on a cutting condition when the cutting tool is used, wherein the determination process further includes determining an abnormality in cutting in which the cutting tool is used, based on a result of comparing the two-dimensional shape indicated by the measurement data that includes the plurality of two-dimensional data corresponding to the plurality of measurement time points in a first period with a two-dimensional shape indicated by the calculation data that is calculated based on the cutting condition in the first period.

12. A processing method for a processing apparatus, the processing method comprising:

obtaining measurement results from a plurality of sensors disposed on a cutting tool, the measurement results being physical quantities each indicating a state related to loads on the cutting tool during cutting;

generating, based on the obtained measurement results from the respective sensors at a plurality of measurement time points, measurement data that is related to the loads in two directions on a plane perpendicular to a rotation axis of the cutting tool and that includes two-dimensional data at each of the measurement time points;

performing a determination process concerning cutting in which the cutting tool is used, based on a two-dimensional shape indicated by the generated measurement data; and acquiring calculation data including a plurality of two-dimensional data regarding the load in two directions on a plane perpendicular to the rotation axis at a plurality of time points, the calculation data being calculated based on a shape of the cutting tool and based on a cutting condition when the cutting tool is used, wherein the determination process further includes including determining an abnormality in cutting in which the cutting tool is used, based on a result of comparing the two-dimensional shape indicated by the generated measurement data that includes a plurality of two-dimensional data corresponding to the plurality of measurement time points in a first period with a two-dimensional shape indicated by the calculation data that is calculated based on the cutting condition in the first period.

13. A non-transitory computer-readable storage medium having stored therein computer-readable instructions as part of a processing program for use in a processing apparatus, the processing program when executed by a computer causing the computer to implement a method, the method comprising:

obtaining measurement results from a plurality of sensors disposed on a cutting tool, the measurement results being physical quantities each indicating a state related to loads on the cutting tool during cutting, generating, based on the measurement results from the respective sensors at a plurality of measurement time points previously obtained, measurement data that is related to the loads in two directions on a plane perpendicular to a rotation axis of the cutting tool and that includes two-dimensional data at each of the measurement time points;

performing a determination process concerning cutting in which the cutting tool is used, based on a two-dimensional shape indicated by the measurement data previously generated; and acquiring calculation data including a plurality of two-dimensional data regarding the load in two directions on a plane perpendicular to the rotation axis at a plurality of time points, the calculation data being calculated based on a shape of the cutting tool and based on a cutting condition when the cutting tool is used, wherein the determination process further includes determining an abnormality in cutting in which the cutting tool is used, based on a result of comparing the two-dimensional shape indicated by the measurement data that includes a plurality of two-dimensional data corresponding to the plurality of measurement time points in a first period with a two-dimensional shape indicated by the calculation data that is calculated based on the cutting condition in the first period.

14. A display system comprising:
a cutting tool for cutting;
a plurality of sensors disposed on the cutting tool; and
a processing apparatus that obtains measurement results measured by the plurality of sensors and processes the obtained measurement results, wherein
the plurality of sensors each being configured to measure a physical quantity that indicates a state related to loads on the cutting tool during cutting, and
the processing apparatus being configured to generate, based on measurement results from the respective sensors at a plurality of measurement time points, measurement data that is related to the loads in two directions on a plane perpendicular to a rotation axis of the cutting tool and that includes two-dimensional data at each of the measurement time points, and to perform a process of displaying a two-dimensional shape indicated by the generated measurement data,
the processing apparatus is configured to obtain calculation data that is calculated based on a shape of the cutting tool and based on a cutting condition when the cutting tool is used and that includes a plurality of pieces of two-dimensional data, at a plurality of time points, related to the loads in the two directions on the plane perpendicular to the rotation axis, and to perform a process of further displaying a two-dimensional shape indicated by the obtained calculation data,
the processor is configured to perform a process of determining an abnormality in cutting in which the cutting tool is used, based on a result of comparing the two-dimensional shape indicated by first measurement data that includes the plurality of pieces of two-dimensional data corresponding to the plurality of time points in a first period with the two-dimensional shape indicated by the calculation data that is calculated based on the cutting condition in the first period, and
the processing apparatus is configured to perform a process of further displaying information indicating a degree of similarity between the two-dimensional shape indicated by the measurement data and the two-dimensional shape indicated by the calculation data.

15. A display system comprising:
a cutting tool for cutting;
a plurality of sensors disposed on the cutting tool; and
a processing apparatus that obtains measurement results measured by the plurality of sensors and processes the obtained measurement results, wherein
the plurality of sensors each being configured to measure a physical quantity that indicates a state related to loads on the cutting tool during cutting,
the processing apparatus being configured to generate, based on measurement results from the respective sensors at a plurality of measurement time points, measurement data that is related to the loads in two directions on a plane perpendicular to a rotation axis of the cutting tool and that includes two-dimensional data at each of the measurement time points, and to perform a process of displaying a two-dimensional shape indicated by the generated measurement data,
the processing apparatus is configured to estimate a cutting condition when the cutting tool is used and to perform a process of further displaying a result of estimation, and
the processing apparatus is configured to obtain calculation data that is calculated based on a cutting condition when the cutting tool is used, and to perform a process of determining an abnormality in cutting in which the cutting tool is used, based on a result of comparing the two-dimensional shape indicated by the generated measurement data that includes a plurality of pieces of the two-dimensional data corresponding to the measurement time points in a first period with a two-dimensional shape indicated by the calculation data that is calculated based on the cutting condition in the first period.

16. A processing apparatus comprising:
a processor configured to
obtain measurement results from a plurality of sensors disposed on a cutting tool, the measurement results being physical quantities each indicating a state related to loads on the cutting tool during cutting,
generate, based on the measurement results from the respective sensors at a plurality of measurement time points previously obtained, measurement data that is related to the loads in two directions on a plane perpendicular to a rotation axis of the cutting tool and that includes two-dimensional data at each of the measurement time points,
perform a process of displaying a two-dimensional shape that is indicated by the measurement data previously generated,
acquire calculation data including a plurality of two-dimensional data regarding the load in two directions on a plane perpendicular to the rotation axis at a plurality of time points, the calculation data being calculated based on a shape of the cutting tool and based on a cutting condition when the cutting tool is used,
determining an abnormality in cutting in which the cutting tool is used, based on a result of comparing the two-dimensional shape indicated by the measurement data that includes a plurality of pieces of two-dimensional data corresponding to the measurement time points in a first period with a two-dimensional shape indicated by the calculation data that is calculated based on the cutting condition in the first period,
perform a process of further displaying a two-dimensional shape indicated by the obtained calculation data, and
perform a process of further displaying information indicating a degree of similarity between the two-dimensional shape indicated by the measurement data and the two-dimensional shape indicated by the calculation data.

17. A processing method for a processing apparatus, the processing method comprising:
obtaining measurement results from a plurality of sensors disposed on a cutting tool, the measurement results being physical quantities each indicating a state related to loads on the cutting tool during cutting;
generating, based on the obtained measurement results from the respective sensors at a plurality of measurement time points, measurement data that is related to the loads in two directions on a plane perpendicular to a rotation axis of the cutting tool and that includes two-dimensional data at each of the measurement time points;
performing a process of displaying a two-dimensional shape that is indicated by the generated measurement data;
acquiring calculation data including a plurality of two-dimensional data regarding the load in two directions on a plane perpendicular to the rotation axis at a plurality of time points, the calculation data being calculated based on a shape of the cutting tool and based on a cutting condition when the cutting tool is used;

performing a determination process of determining an abnormality in cutting in which the cutting tool is used, based on a result of comparing the two-dimensional shape indicated by the generated measurement data that includes the plurality of pieces of two-dimensional data corresponding to the measurement time points in a first period with a two-dimensional shape indicated by the calculation data that is calculated based on the cutting condition in the first period;

performing a process of further displaying the two-dimensional shape indicated by the obtained calculation data; and performing a process of further displaying information indicating a degree of similarity between the two-dimensional shape indicated by the measurement data and the two-dimensional shape indicated by the calculation data.

18. A non-transitory computer-readable storage medium having stored therein computer-readable instructions as part of a processing program for use in a processing apparatus, the processing program when executed by a computer causing the computer to implement a method, the method comprising:

obtaining measurement results from a plurality of sensors disposed on a cutting tool, the measurement results being physical quantities each indicating a state related to loads on the cutting tool during cutting, generating, based on the measurement results from the respective sensors at a plurality of measurement time points previously obtained, measurement data that is related to the loads in two directions on a plane perpendicular to a rotation axis of the cutting tool and that includes two-dimensional data at each of the measurement time points;

performing a process of displaying a two-dimensional shape that is indicated by the measurement data previously generated;

acquiring calculation data including a plurality of two-dimensional data regarding the load in two directions on a plane perpendicular to the rotation axis at a plurality of time points, the calculation data being calculated based on a shape of the cutting tool and based on a cutting condition when the cutting tool is used;

performing a determination process of determining an abnormality in cutting in which the cutting tool is used, based on a result of comparing the two-dimensional shape indicated by the measurement data that includes the plurality of two-dimensional data corresponding to the measurement time points in a first period with a two-dimensional shape indicated by the calculation data that is calculated based on the cutting condition in the first period;

performing a process of further displaying the two-dimensional shape indicated by the obtained calculation data; and performing a process of further displaying information indicating a degree of similarity between the two-dimensional shape indicated by the measurement data and the two-dimensional shape indicated by the calculation data.

* * * * *